US008931098B2

(12) United States Patent
Yoshioka et al.

(10) Patent No.: US 8,931,098 B2
(45) Date of Patent: Jan. 6, 2015

(54) DETECTING METHOD AND DEVICE

(71) Applicant: Fujitsu Limited, Kawasaki-shi, Kanagawa (JP)

(72) Inventors: Takashi Yoshioka, Kawasaki (JP); Hiroshi Tsuda, Fujisawa (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 13/792,331

(22) Filed: Mar. 11, 2013

(65) Prior Publication Data

US 2013/0305367 A1 Nov. 14, 2013

(30) Foreign Application Priority Data

May 10, 2012 (JP) ................................. 2012-108092

(51) Int. Cl.
*H04L 29/06* (2006.01)
*H04L 12/58* (2006.01)

(52) U.S. Cl.
CPC ............ *H04L 63/1408* (2013.01); *H04L 51/12* (2013.01); *H04L 63/061* (2013.01); *H04L 63/1466* (2013.01)
USPC ................. 726/23; 726/21; 726/26; 713/162; 713/170; 713/171; 380/229; 709/204; 709/206

(58) Field of Classification Search
CPC . H04L 63/123; H04L 63/0823; H04L 9/3263; H04L 12/58; H04L 9/0822
USPC ................ 726/23, 21, 26; 713/162, 170, 171; 380/229; 709/204, 206
See application file for complete search history.

(56) References Cited

U.S. PATENT DOCUMENTS

| 8,423,616 | B2 * | 4/2013 | Pouzin et al. | 709/206 |
| 2006/0031315 | A1 * | 2/2006 | Fenton et al. | 709/206 |
| 2006/0085505 | A1 * | 4/2006 | Gillum et al. | 709/206 |
| 2006/0179317 | A1 * | 8/2006 | Soumiya et al. | 713/176 |
| 2006/0288219 | A1 * | 12/2006 | Adams et al. | 713/176 |
| 2006/0294368 | A1 * | 12/2006 | Adams et al. | 713/156 |

(Continued)

FOREIGN PATENT DOCUMENTS

JP 2006-134313 5/2006

OTHER PUBLICATIONS

Crain et al., Fighting Phishing with Trusted Email, copyright 2010, IEEE, 6 pages.*

(Continued)

*Primary Examiner* — Jeffrey Pwu
*Assistant Examiner* — Baotram Tran
(74) *Attorney, Agent, or Firm* — Oblon, Spivak, McClelland, Maier & Neustadt, L.L.P.

(57) ABSTRACT

A method includes: generating object information that indicates an object designated from among a header item, text, and attached information of a received email, or feature amount information based on the object information and a predetermined function, when a source is an address in an internal network, decrypting verification information added to the received email using secret key information shared in the internal network, when the source is an address over an external network, decrypting the verification information using public key information shared with the source, and verifying whether or not the received email is a spoofed mail based on the object information or the feature amount information, and the decrypted verification information.

15 Claims, 19 Drawing Sheets

(56) References Cited

U.S. PATENT DOCUMENTS

| | | | |
|---|---|---|---|
| 2007/0011253 A1* | 1/2007 | Taylor | 709/206 |
| 2008/0275957 A1* | 11/2008 | Pouzin et al. | 709/206 |
| 2009/0100079 A1* | 4/2009 | Yoshioka | 707/100 |
| 2009/0113012 A1* | 4/2009 | Singer | 709/206 |
| 2009/0198997 A1* | 8/2009 | Yeap et al. | 713/155 |
| 2009/0210501 A1* | 8/2009 | Risher et al. | 709/206 |
| 2009/0216842 A1* | 8/2009 | Risher et al. | 709/206 |
| 2009/0248812 A1* | 10/2009 | Fried et al. | 709/206 |
| 2010/0017598 A1* | 1/2010 | Rodriguez et al. | 713/156 |
| 2012/0204032 A1* | 8/2012 | Wilkins et al. | 713/170 |

OTHER PUBLICATIONS

Jang et al., Trusted Email Protocol: Dealing with Privacy Concerns from Malicious Email Intermediaries, © 2008, IEEE, 6 pages.*

Palmieri et al., Introducing Public E-Mail Gateways: An Effective Hardening Strategy Against Spam, © 2005 Springer-Verlag Berlin Heidelberg, 10 pages.*

Julian Mehnle. "Sender Policy Framework Project Overview", <http:// www.openspf.org/>, Apr. 4, 2012, 3 pages.

"DomainKeys Identified Mail (DKIM)", DKIM.org., <http:// www.dkim.org>, Apr. 4, 2012, 2 pages.

* cited by examiner

FIG. 11

EXAMPLE OF LIST OF CANDIDATES OF FEATURE AMOUNT OBJECT ITEM

| IMPORTANCE A | From, To, Subject, Received, Date, Message-Id, X-Mailer, Body, File |
|---|---|
| IMPORTANCE B | From, To, Subject, Received, Date, Message-Id, Body, File |
| IMPORTANCE C | From, Subject, Date, Body, File |
| IMPORTANCE D | From, Subject, Date, Body |
| ... | ... |

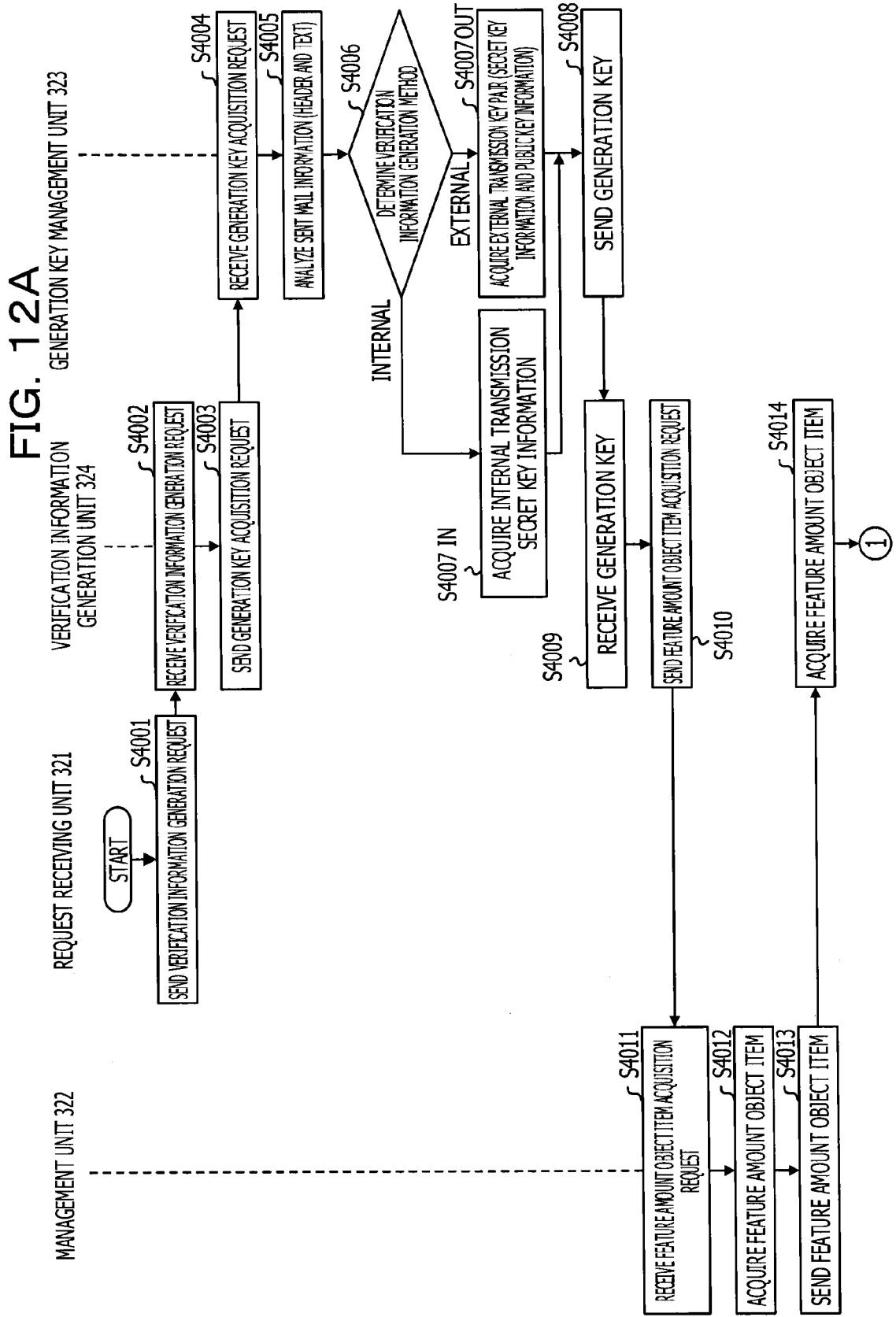

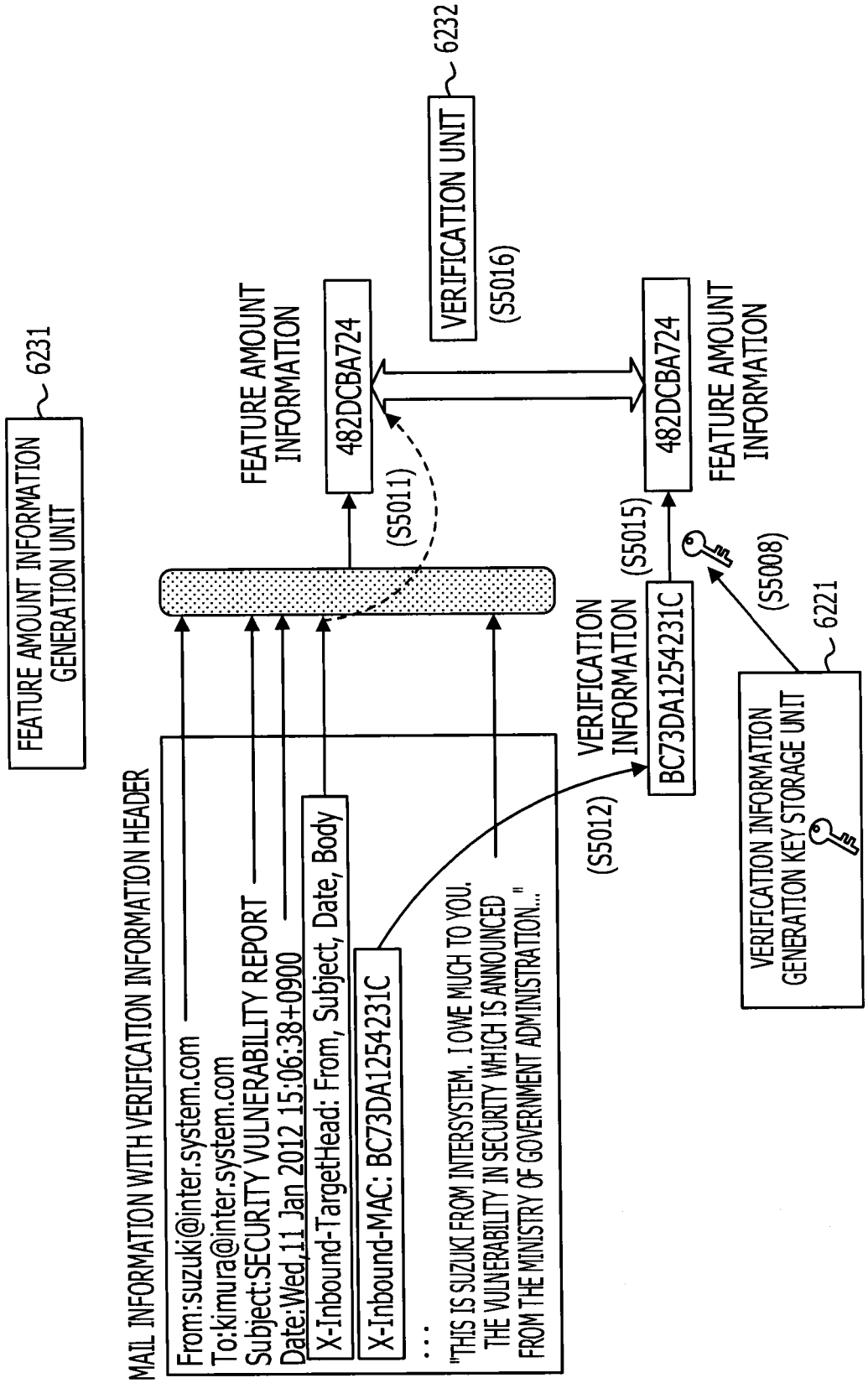

DETECTING METHOD AND DEVICE

CROSS-REFERENCE TO RELATED APPLICATION

This application is based upon and claims the benefit of priority from the prior Japanese Patent Application No. 2012-108092, filed on May 10, 2012, the entire contents of which are incorporated herein by reference.

FIELD

The embodiments discussed herein are related to a method of detecting a spoofed mail, a medium which stores a detection program, a detection device, a device for sending an email, and an apparatus for receiving an email.

BACKGROUND

In recent years, targeted attacks aimed at a specific company or a personal computer have been rapidly increasing. Particularly, targeted attacks at companies, government organizations, or the like by spoofed emails have been rapidly increasing. A mail sent by a targeted attack is called a targeted attack mail. The targeted attack mail is a virus mail sent to a specific company or organization as a target for the purpose of stealing confidential information. When an attached file with a malicious code is opened, an illegitimate or spoofed activity in which, for example, personal information is leaked out is performed.

An antivirus software according to the related art registers spoofed program collation information as a signature of problematic program. In addition, the antivirus software blocks viral infection by detecting an attached file or the like that matches the signature. However, the antivirus software is normally not useful in an attack mail that uses a program that has a signature which is not registered. Moreover, there are many cases where it is difficult for the antivirus software to detect at first glance that an attached file or text is suspicious if it is carefully written. Therefore, viral infection may not be completely blocked. In addition, there are limitations on strictly checking the consistency of an email header, an attached file, text, a sender address, and the like by each user.

As a countermeasure technique according to the related art, there is sending domain authentication. This is a technique in which the legitimacy of a sending mail server and the trail of a transmission path are achieved on the server side. Specifically, sending domain authentication checks the domain of an email address and verifies whether or not the email is sent from a legitimate server. In addition, sending domain authentication proves that the address of the sender is legitimate. For example, this technique is disclosed in Japanese Laid-open Patent Publication No. 2006-134313.

As types of sending domain authentication, there are mainly two types of authentication including authentication by an IP address and authentication by an e-signature. The authentication by an IP address is, for example, authentication using Sender Policy Framework (SPF) or Sender ID. The authentication by an IP address opens association between the domain of an email server and the IP address of a sender (SPF records) to a Domain Name System (DNS) server. The DNS server is inquired of the sender IP address during reception and collation is performed, thereby confirming that the address of the sender is legitimate. Details of this technique are disclosed in, for example, Sender Policy Framework Project Overview.

The authentication by an e-signature is, for example, Domain Keys Identified Mail (DKIM). DKIM opens public key information of an email server to a DNS server, adds an e-signature as a secret key, and sends an email. In addition, DKIM inquires the DNS server of the public key information during reception and performs collation of the e-signature, thereby confirming that the address of a sender is legitimate. This technique is disclosed in, for example, DKIM.org.

SUMMARY

According to an aspect of the invention, a detecting method which detects a spoofed mail to be executed by a computer, the detecting method includes: sharing internal transmission secret key information to be used for an email over an internal network in advance by a sending terminal and a receiving terminal; generating external transmission secret key information to be used for an email over an external network and external transmission public key information corresponding to the external transmission secret key information; when a destination of a sent mail is the internal network, generating verification information using first feature amount object information having a feature amount object item from among a header item, text, and attached information included in the sent mail, or first feature amount information generated based on the first feature amount object information and a predetermined function, and the internal transmission secret key information; when the destination of the sent mail is the external network, generating the verification information, based on the first feature amount object information or the first feature amount information, and the external transmission secret key information; adding the verification information and feature amount object item information corresponding to the feature amount object item to a header of the sent mail; generating second feature amount object information having a feature amount object item represented by the feature amount object item information added to a received mail from among a header item, text, and attached information included in the received mail, or second feature amount information based on the second feature amount object information and the predetermined function; when a source of the received mail is the internal network, generating third feature amount object information or third feature amount information, based on the verification information and the internal transmission secret key information; when the source of the received mail is the external network, generating the third feature amount object information or the third feature amount information, based on the verification information and the external transmission public key information; and comparing the second feature amount object information or the second feature amount information to the third feature amount object information or the third feature amount information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of a list of candidates of the feature amount object item set in accordance with the importance of mail contents;

FIGS. 12A and 12B are flowcharts of a process of generating verification information in a verification information generation device of an email sending terminal;

FIG. 16 is a diagram illustrating an example of the verification process during use of an internal generation key.

DESCRIPTION OF EMBODIMENTS

Figure 1:
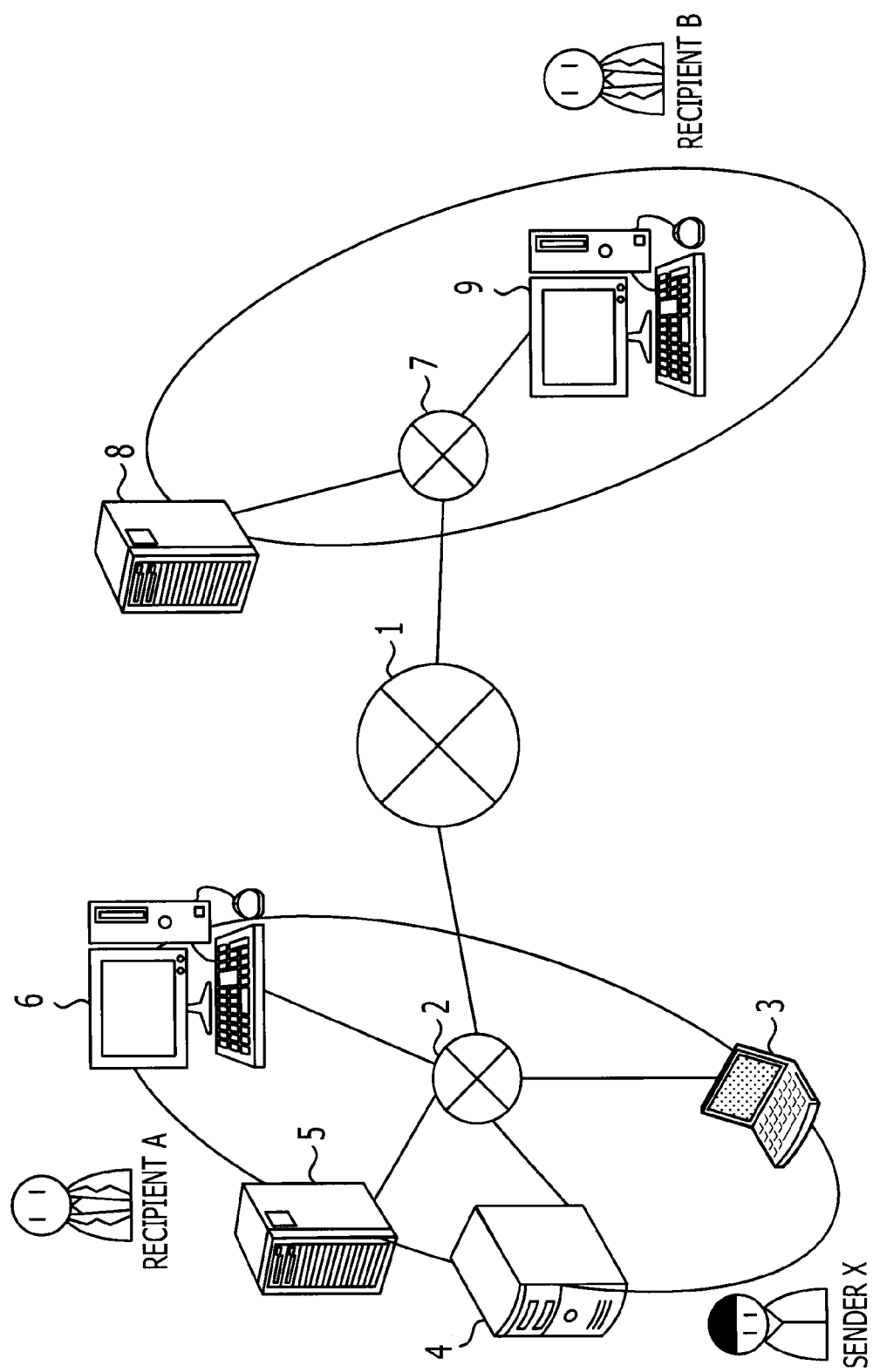
FIG. 1 is a configuration diagram of an email system according to an embodiment.

In a case of a targeted attack mail, a source address is also spoofed and masquerades as being sent using a legitimate server. Therefore, checking the source address by sending domain authentication may not guarantee the real identity. In addition, in sending domain authentication, a DNS server for detecting a targeted attack mail is installed, and thus operation cost is increased.

An object of this embodiment is to detect a spoofed mail such as a targeted attack mail on the client side.

In this embodiment, the spoofed mail is, for example, a targeted attack mail. The targeted attack mail is externally similar to a normal mail that is typically received by a recipient and thus passes through filtering of spam mails or virus mails and is received. In addition, when the recipient opens an attached file of the received mail or accesses an attached URL, an illegitimate or spoofed activity in which, for example, personal information is leaked out is performed. Being externally similar is referred to as a case where, for example, a source address or text is the same as or very similar to a normal mail and thus may not be captured by a filter of general spam mails or virus mails.

A mail checker in this embodiment is a program installed in a terminal device along with a mail software. The mail checker generates verification information described as follows when the mail software sends an email and adds the generated information to the email. The mail checker performs a verification process using verification information described as follows when the mail software receives an email. The mail checker announces to a user a warning about a received mail being suspected as a spoofed mail.

Generation of verification information is performed as an encryption process using predetermined encryption key information, and in this example, a sent mail sent across an intranet (internal network) uses internal transmission secret key information that is internally and secretly managed. In addition, in this example, a sent mail that is sent over the Internet (external network) uses external transmission secret key information and public key information thereof. The internal transmission secret key information is shared with an email terminal device in the Intranet. The internal transmission secret key information does not share a common key with the email terminal over the external network. Therefore, in this example, an encryption method of secret key information and public key information is used for a sent mail that is sent over the Internet (external network).

In addition, in this example, as encryption object information, feature amount information generated by operating information extracted from the header information, text, and attached information of the sent mail using a function of a predetermined algorithm is used. Therefore, in this example, information of the sent mail to be extracted and the function of an algorithm that generates the feature amount information are kept secret, thereby further enhancing security characteristics.

Entire Configuration of Email System

FIG. 1 is a configuration diagram of an email system in this embodiment. Referring to FIG. 1, the entire structure of the email system will be described.

In FIG. 1, two intranets 2 and 7 are connected to each other via an internet communication line network 1. In the intranet 2 used by a sender X and a recipient A, an email sending terminal 3 of the sender X, an email receiving terminal 6 of the recipient A, a sending mail (SMTP) server 4, and a receiving mail (POP) server 5 are connected.

In addition, a receiving mail (POP) server 8 and an email receiving terminal 9 are connected to the intranet 7 used by a recipient B.

SMTP is the abbreviation for Simple mail Transfer Protocol. SMTP is a protocol for sending an email over the Internet or the intranet. The sending mail (SMTP) server 4 is able to send an email using the protocol. POP is the abbreviation for Post Office Protocol. POP is a protocol for receiving a mail from a server that saves an email on the Internet or the intranet. The receiving mail (POP) server 5 and the receiving mail (POP) server 8 are able to receive emails using the protocol.

In this embodiment, a case where the sender X sends an email from the email sending terminal 3 to the email receiving terminal 6 of the recipient A in the same intranet 2 or to the email receiving terminal 9 of the recipient B in the external intranet 7 via the Internet 1 will be described. As a matter of course, the sender X sends an email to the recipients A and B through broadcasting.

Configuration of Each Terminal Device of Email System

Figure 2:
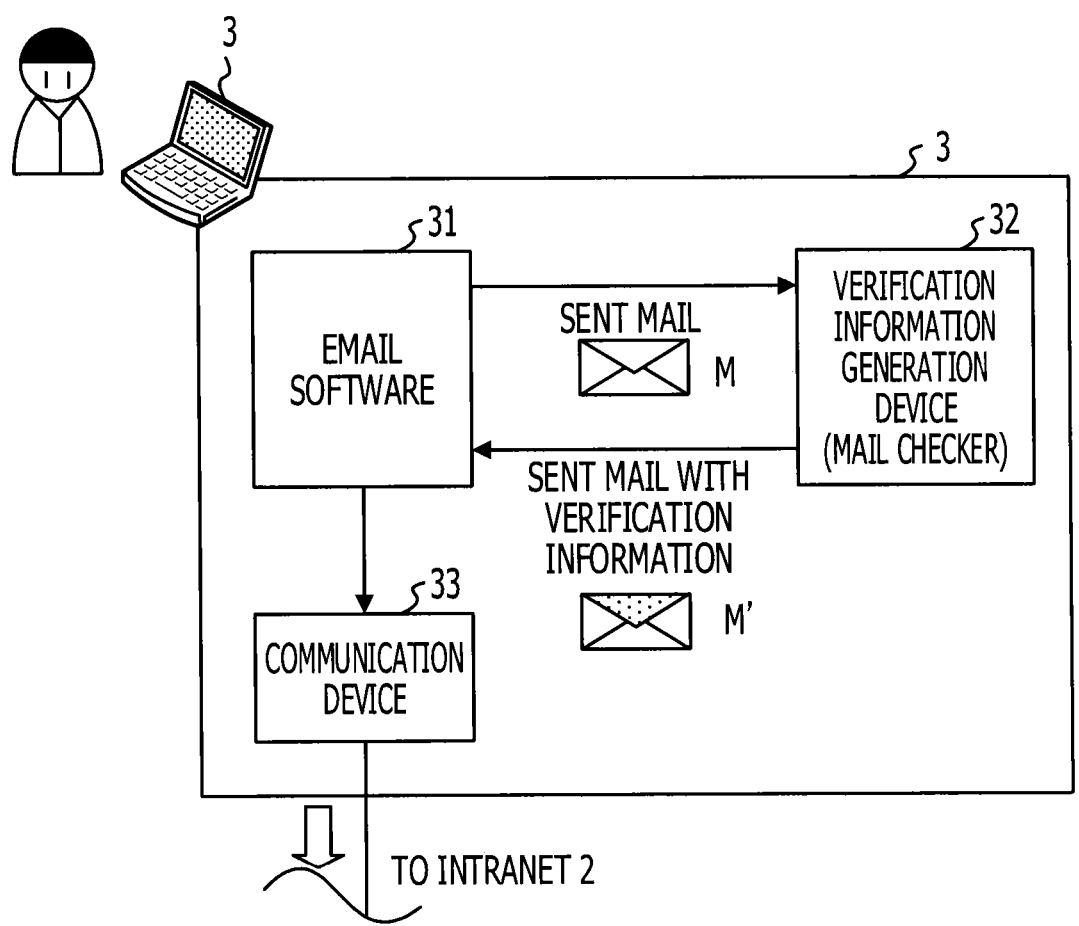
FIG. 2 is a diagram of an image of configuration of an email sending terminal used by a sender.

FIG. 2 is a diagram of a configuration image of the email sending terminal used by the sender. The email sending terminal 3 is a computer in which an email software 31 that causes the sender to write an email or instruct sending is installed. In addition, the email sending terminal 3 has a verification information generation device 32 which generates verification information that becomes information for checking whether or not there is a possibility of a targeted attack mail and a communication device 33 which sends an email through the intranet 2. The email software 31 corresponds to a mailer program such as Outlook® from Microsoft Corporation, Thunderbird® from the Mozilla Foundation, or the like. In addition, as the CPU of a computer executes a mail checker program that detects a spoofed mail, the email sending terminal 3 functions as the verification information generation device 32.

Figure 3:
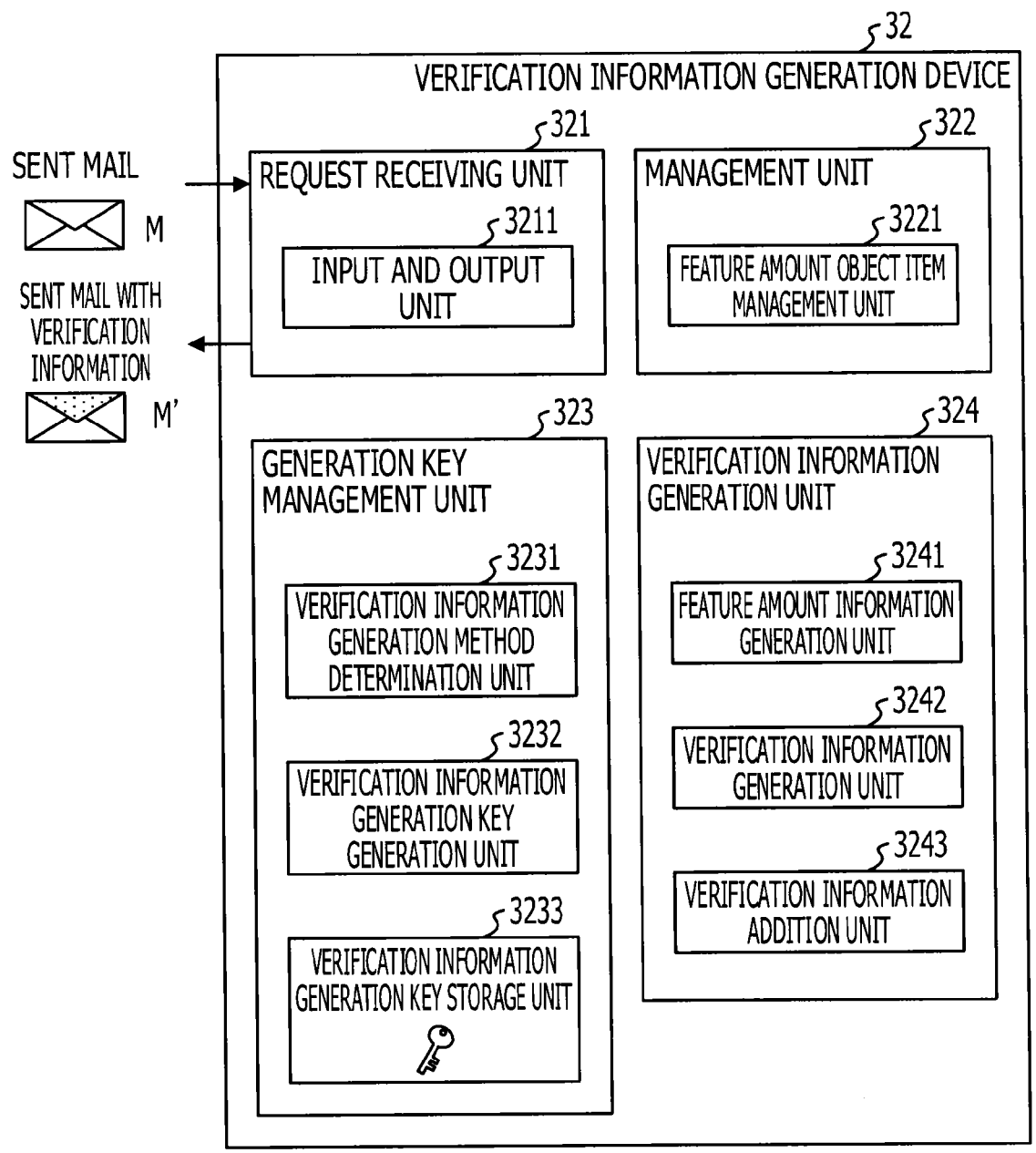
FIG. 3 is a function block diagram of a verification information generation device.

FIG. 3 is a function block diagram of the verification information generation device. The verification information generation device 32 has a request receiving unit 321, a management unit 322, a generation key management unit 323, and a verification information generation unit 324.

The request receiving unit 321 has an input and output unit 3211. The request receiving unit 321 receives a request for generation of verification information for a sent mail M from the email software 31. The request receiving unit 321 returns a sent mail M' with the verification information to the email software 31.

The management unit 322 has a feature amount object item management unit 3221. The management unit 322 manages a feature amount object item indicating an object for which a feature amount is generated.

The generation key management unit 323 deals with generation keys used for generating the verification information. The generation key is the internal transmission secret key information, the external transmission secret key information, and the external transmission public key information described above. The external transmission public key information is information that forms a pair with the external transmission secret key information. The generation key management unit 323 has a verification information generation method determination unit 3231 that determines whether to use the internal transmission secret key or the external transmission secret key, a verification information generation key generation unit 3232 that generates the above-mentioned three types of key information, and a verification information generation key storage unit 3233 that secretly stores the internal transmission and the external transmission secret key information from among the three types of key information.

The verification information generation unit 324 generates the verification information and adds the information to the sent mail. The verification information generation unit 324 has a feature amount information generation unit 3241 that generates feature amount information or the like from the header information, text, and attached information of the sent mail, a verification information generation unit 3242 that encrypts the feature amount information and generates the verification information, and a verification information addition unit 3243 that adds the generated verification information or the like to the header of the sent mail.

Figure 4:
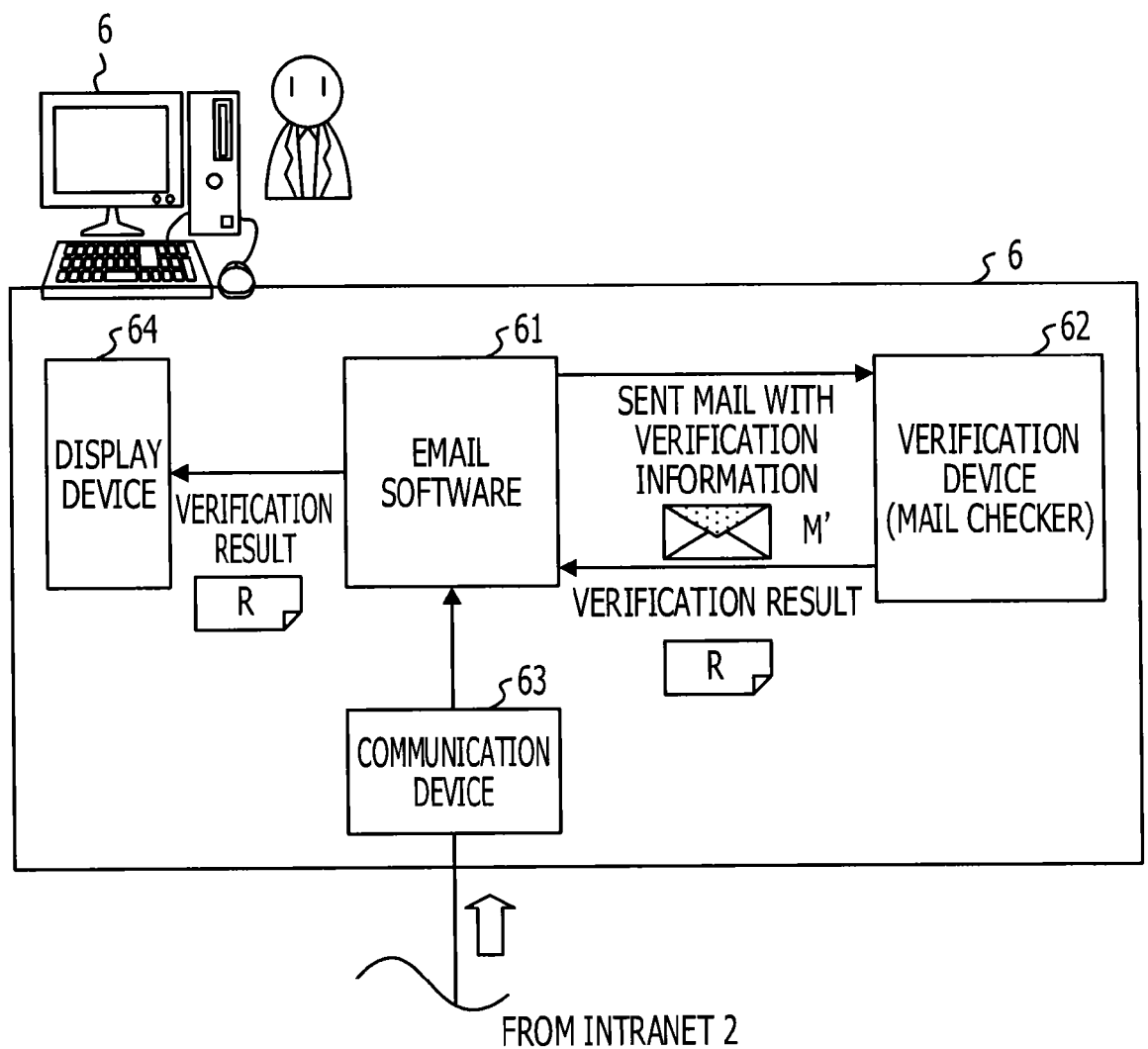
FIG. 4 is a diagram of an image of configuration of an email receiving terminal.
Figure 5:
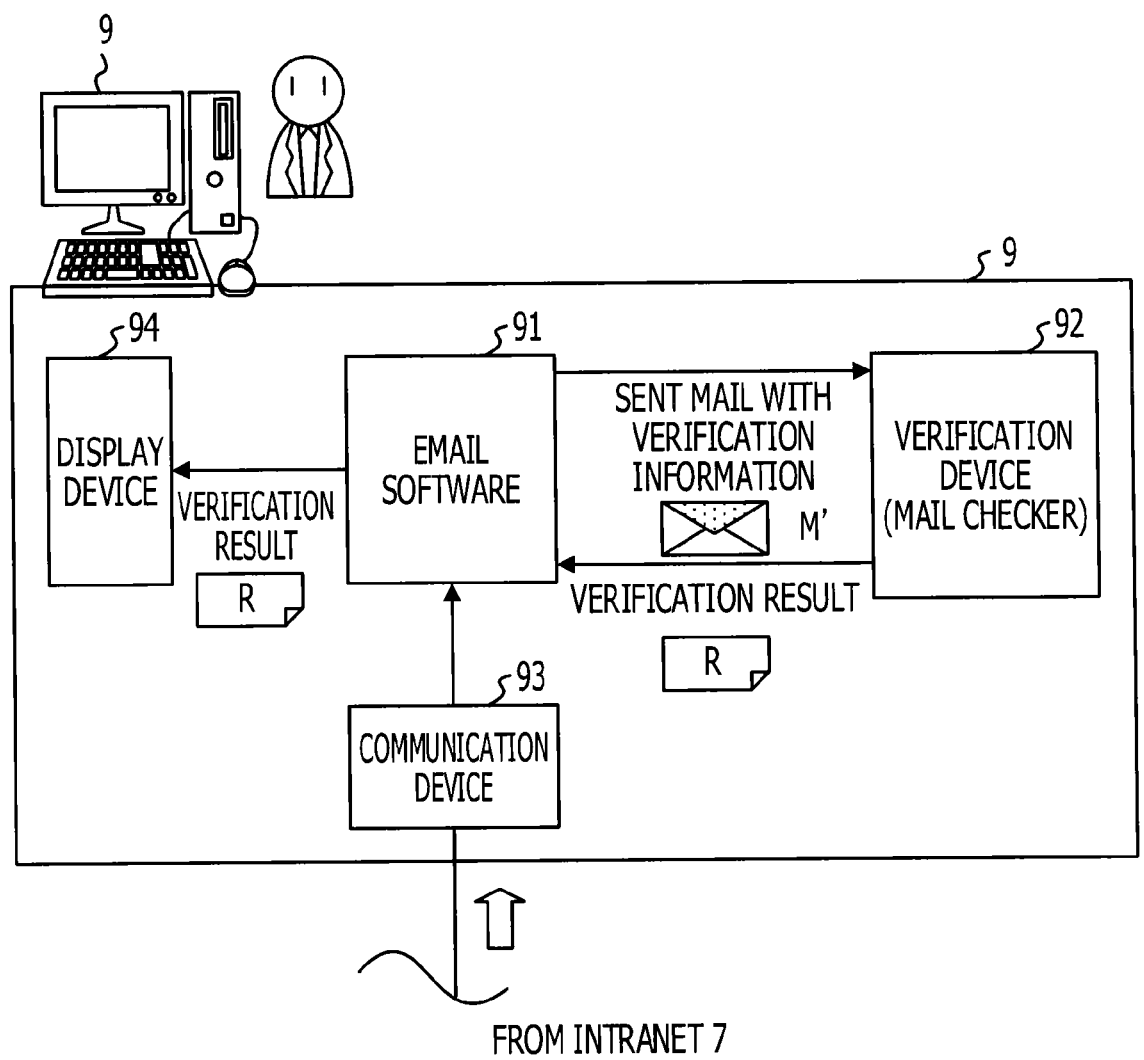
FIG. 5 is a diagram of an image of configuration of an email receiving terminal.

FIG. 4 is a diagram of a configuration image of the email receiving terminal 6. FIG. 5 is a diagram of a configuration image of the email receiving terminal 9. The email receiving terminal 6 of FIG. 4 is a terminal used by the recipient A connected to the intranet 2. The email receiving terminal 9 of FIG. 5 is a terminal used by the recipient B connected to the intranet 7.

The email receiving terminals 6 and 9 are computers in which the email software 61 and software 91 respectively instructed by the recipient A and B to receive an email are installed. The email receiving terminals 6 and 9 have verification devices 62 and 92 respectively that verify the verification information and communication devices 63 and 93 that respectively receive emails from the intranets 2 and 7. The email software 61 and software 91 correspond to a mailer program such as Outlook® from Microsoft Corporation, Thunderbird® from the Mozilla Foundation, or the like, as in the email sending terminal 3. In addition, as the CPU executes the mail checker program that detects a spoofed mail, the email receiving terminals 6 and 9 also function as a verification device 62 or 92.

Figure 6:
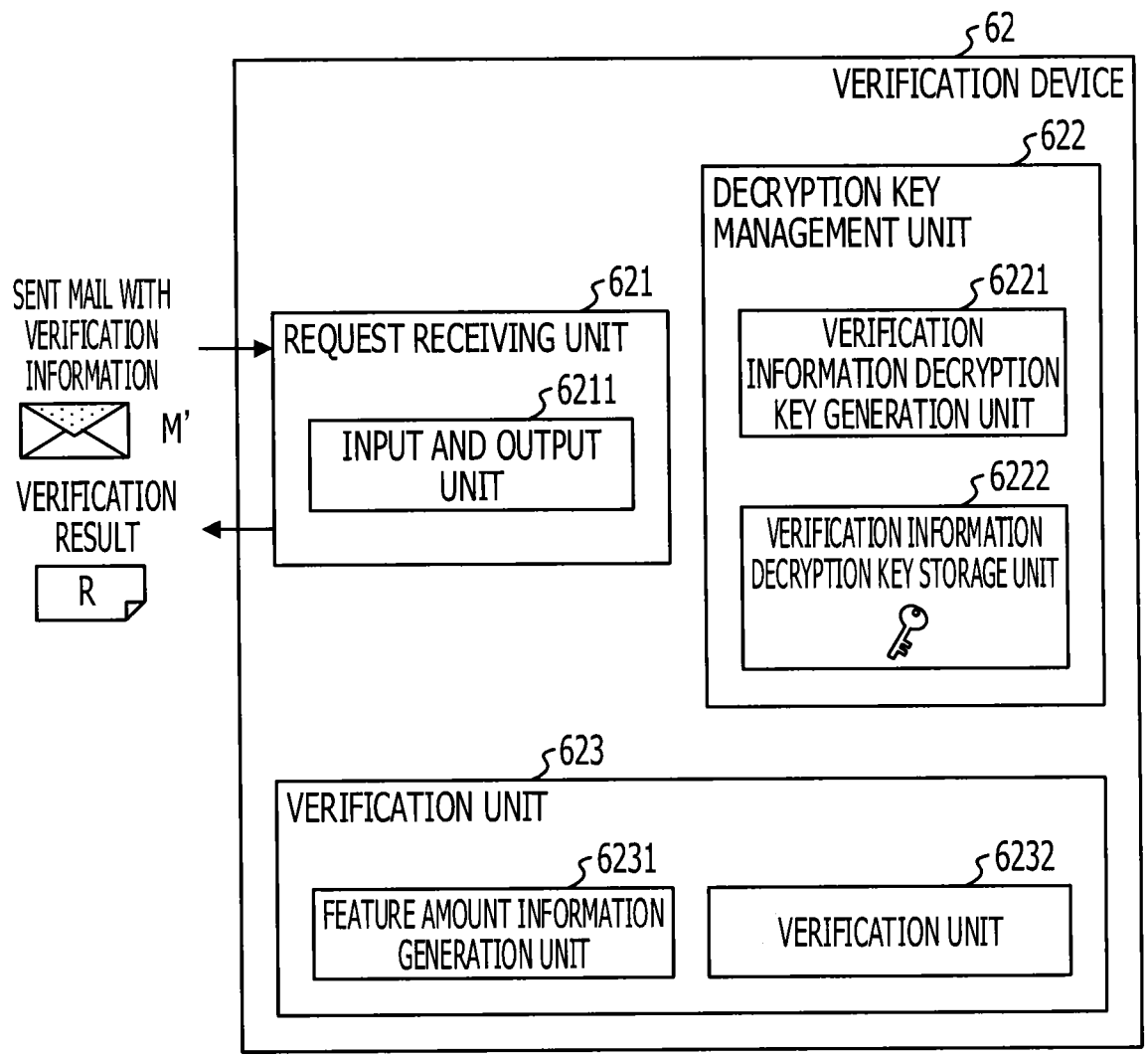
FIG. 6 is a function block diagram of a verification device of the email receiving terminal illustrated in FIG. 4.

FIG. 6 is a function block diagram of the verification device of the email receiving terminal 6. The verification device 62 has a request receiving unit 621, a decryption key management unit 622, and a verification unit 623.

The request receiving unit 621 has an input and output unit 6211. The request receiving unit 621 receives a request for verification of the verification information included in the email received from the email software 61. The request receiving unit 621 returns the verification result to the email software 61.

The decryption key management unit 622 generates and manages a decryption key used for decrypting the verification information. The decryption key is internal transmission secret key information. The internal transmission secret key information is used during verification of an email internally sent from the intranet 2. The decryption key management unit 622 has a verification information decryption key generation unit 6221 and a verification information decryption key storage unit 6222.

The verification unit 623 generates the feature amount information from information of a feature amount object item. In addition, the information of the feature amount object item is, for example, header information, text, or attached information. The verification unit 623 decrypts the verification information added to the received mail using the decryption key. In addition, the verification unit 623 generates the feature amount information from the decrypted verification information. The verification unit 623 verifies the verification information by comparing both types of feature amount information. The verification unit 623 has a feature amount information generation unit 6231 that generates the feature amount and a verification unit 6232 that verifies the verification information.

Figure 7:
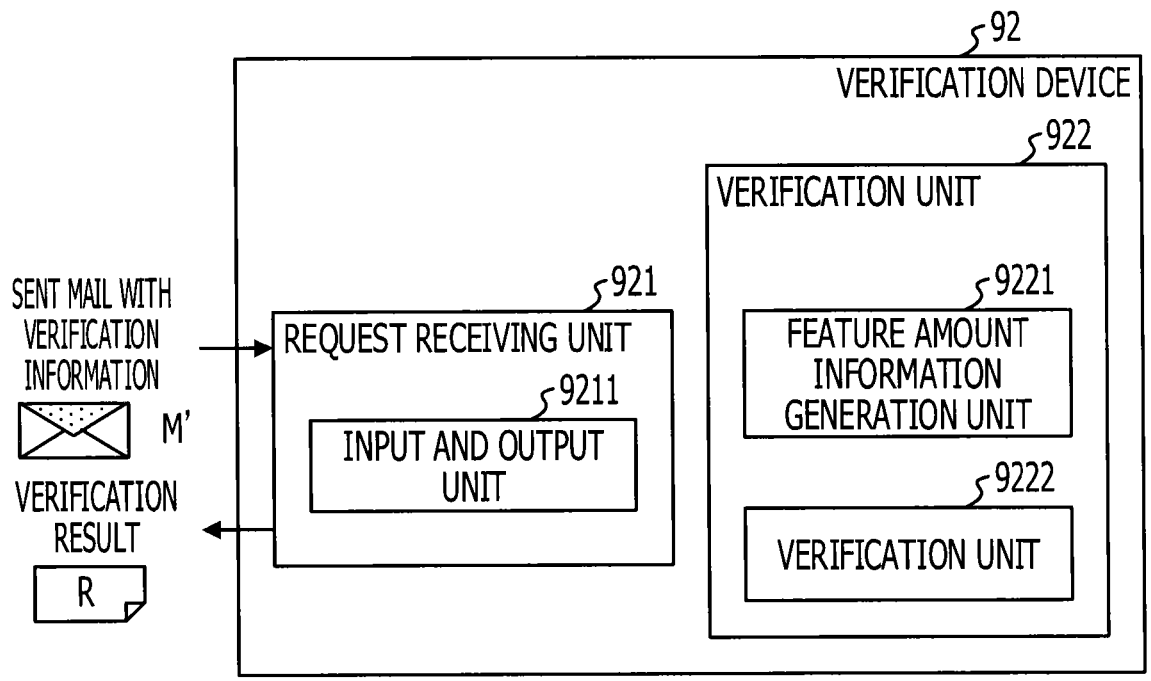
FIG. 7 is a function block diagram of a verification device of the email receiving terminal illustrated in FIG. 5.

FIG. 7 is a function block diagram of the verification device of the email receiving terminal 9. The verification device 92 has a request receiving unit 921 and a verification unit 922. The request receiving unit 921 has an input and output unit 9211. The request receiving unit 921 receives a request for verification of the verification information included in the email received from the email software 91. The request receiving unit 921 returns the verification result to the email software 91.

The verification unit 922 generates the feature amount information from the information of the feature amount object item. In addition, the information of the feature amount object item is, for example, header information, text, or attached information. The verification unit 922 decrypts the verification information added to the received mail using the decryption key. In addition, the verification unit 922 generates the feature amount information from the decrypted verification information. The verification unit 922 verifies the verification information by comparing both types of feature amount information. The verification unit 922 has a feature amount information generation unit 9221 and a verification unit 9222.

In the email receiving device 9 of the intranet 7 that is outside the intranet 2 of the sender X, since the verification device 92 is on the premise that reception and verification of an email from the outside are performed, a decryption key management unit that stores the internal transmission secret key information may not be held.

Process of Email System and Process of Advance Preparation

Next, the flow of a process of the email system will be described. As illustrated in FIG. 1, the sender X writes a sent mail on the email sending terminal 3. In addition, verification information is generated by the mail checker. The verification information is added to the sent mail, and the sent mail is sent to the recipient A or B. The recipient A receives the email through the email receiving terminal 6. The received mail is verified by the mail checker. The mail checker outputs a warning when the received mail is suspected as a spoofed mail such as a targeted attack mail. Similarly, the recipient B receives the email through the email receiving terminal 9. The mail checker performs verification and an output of the warning.

Figure 8:
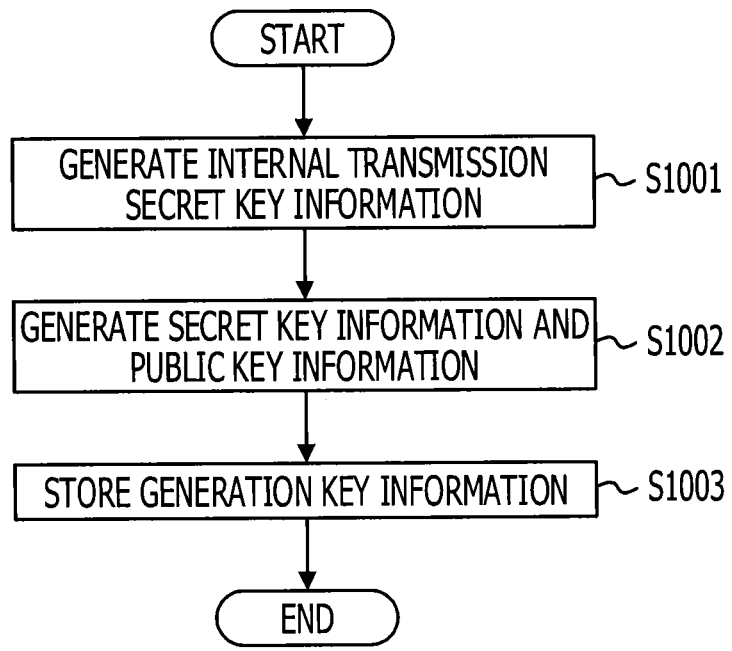
FIG. 8 is a flowchart of a process of generating and storing an authentication information generation key by a generation key management unit.
Figure 9:
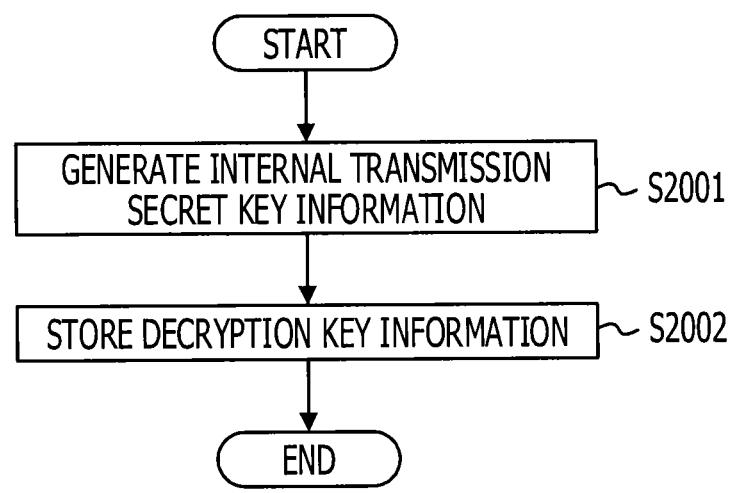
FIG. 9 is a flowchart of a process of generating and storing a decryption key by a decryption key management unit.
Figure 10:
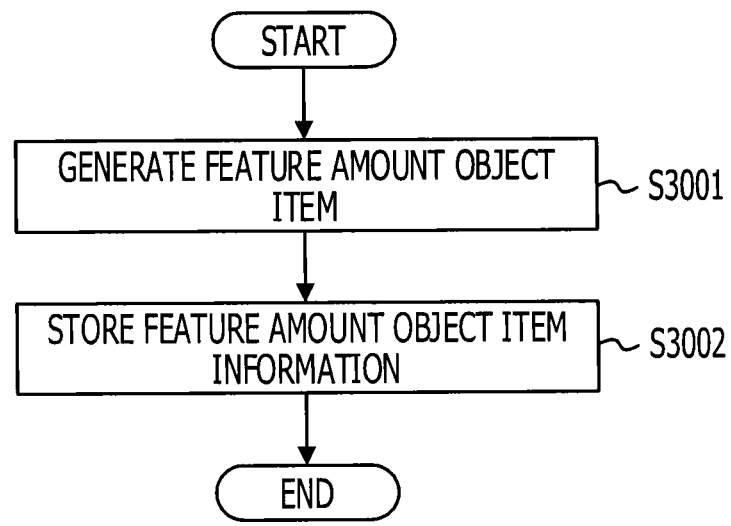
FIG. 10 is a flowchart of a process of generating and storing a feature amount object item in a management unit.

FIGS. 8, 9, and 10 is a flowchart of the process of the mail checker performed as an advance preparation to start the process of sending and receiving an email.

FIG. 8 is a flowchart of a process of generating and storing an authentication information generation key by the generation key management unit 323. The email sending terminal 3 generates the authentication information generation key for generating authentication information in advance before performing a process of sending an email. In addition, the email sending terminal 3 stores the authentication information generation key.

The generation key management unit 323 generates the internal transmission secret key information (S1001). Furthermore, the generation key management unit 323 generates the external transmission secret key information and the public key information which are a pair of the external transmission keys (S1002). The verification information generation key storage unit 3233 stores such key information (S1003). Here, the internal transmission secret key information and the external transmission secret key information are safely stored so that the information is not leaked out.

As an internal transmission key, the internal transmission secret key information is shared by the sending side and the receiving side, and thus verification information is generated using information known only to each side. Therefore, an attacker is not able to make verification information without knowing the secret information. Accordingly, protection against a spoofed email is possible.

FIG. 9 is a flowchart of a process of generating and storing a decryption key by the decryption key management unit 622. The email receiving terminal 6 generates a key for decrypting the verification information in advance before performing a process of receiving an email. In addition, the email receiving terminal 6 stores the key for decrypting the verification information.

Here, the decryption key management unit 622 generates the internal transmission secret key information (S2001). The decryption key storage unit 6222 stores the internal transmission secret key information (S2002). Here, the internal transmission secret key information is safely stored so as not to be leaked out.

The encryption key in the sending terminal and the internal transmission secret key information which is the decryption key in the receiving terminal is written by the same algorithm in the sending terminal and the receiving terminal. That is, the algorithm is the same information that only the verification information generation device 32 of the sending terminal and the verification device 62 of the receiving terminal know.

FIG. 10 is a flowchart of a process of generating and storing the feature amount object item in the management unit 322. The email sending terminal 3 selects in advance a feature amount object item that indicates an item to be extracted from the header information, text information, and attached information of the sending mail so as to generate the feature amount, before starting the sending of the email. In other words, the feature amount object item is information that indicates which item of the information included in the sending mail is a verification object. The feature amount object item is determined by the verification information generation device 32. Information that indicates the feature amount object item is called feature amount object item information. The feature amount object item information is, for example, From header or Body text. In addition, the information of the feature amount object item is called feature amount object information. The feature amount object information is the address of From header when, for example, the feature amount object item is From header.

A policy on generating the feature amount object item may be managed by the verification information generation device 32. In addition, the feature amount object item may be individually generated in units of mails in accordance with the importance of mail contents. In addition, all written mails may be generated as the same object header item. This control may be performed by information of the policy on generating the feature amount object item described above.

FIG. 11 is a diagram illustrating an example of a list of candidates of the feature amount object item set in accordance with the importance of mail contents. In this example, the feature amount object item varies in accordance with the importance of an email, and as the importance is closer to A, more items are selected. In this example, as the importance is closer to A, the importance is higher.

Referring to the list of candidates of the feature amount object item of FIG. 11, the verification information generation device 32 selects a feature amount object item in accordance with the importance of mail contents. In addition, the verification information generation device 32 selects a candidate determined in advance. Based on the selected feature amount object item, feature amount information is generated as described below.

In this embodiment, an example of selecting feature amount object items, that is, items of From, Subject, Date, and Body having an importance D is described. In addition, the management unit 322 generates a feature amount object item (S3001). The feature amount object item management unit 3231 stores the feature amount object item information (S3002).

In the process of the advance preparation described above, generation of secret key information is performed as a registration process, for example, when the mail checker is installed. In addition, the secret key information is regularly changed. The internal transmission secret key information is secretly shared by all the mail checkers on the same intranet. In addition, the external transmission secret key information is secretly shared by all the mail checkers.

In addition, feature amount generation function information described later is also determined in the stage of the advance preparation. In addition, it is preferable that all the mail checkers be secretly shared. The feature amount generation function information is an algorithm of feature amount generation and information on a function used to generate the feature amount information. Generation and storage of the feature amount generation function information are performed by, for example, the management unit 322 of the email sending terminal 3. In addition, the feature amount generation function information is shared by the email receiving terminals 6 and 9.

Process of Sending Email

Next, a process of sending an email by the email sending terminal 3 will be described.

Figure 12B:
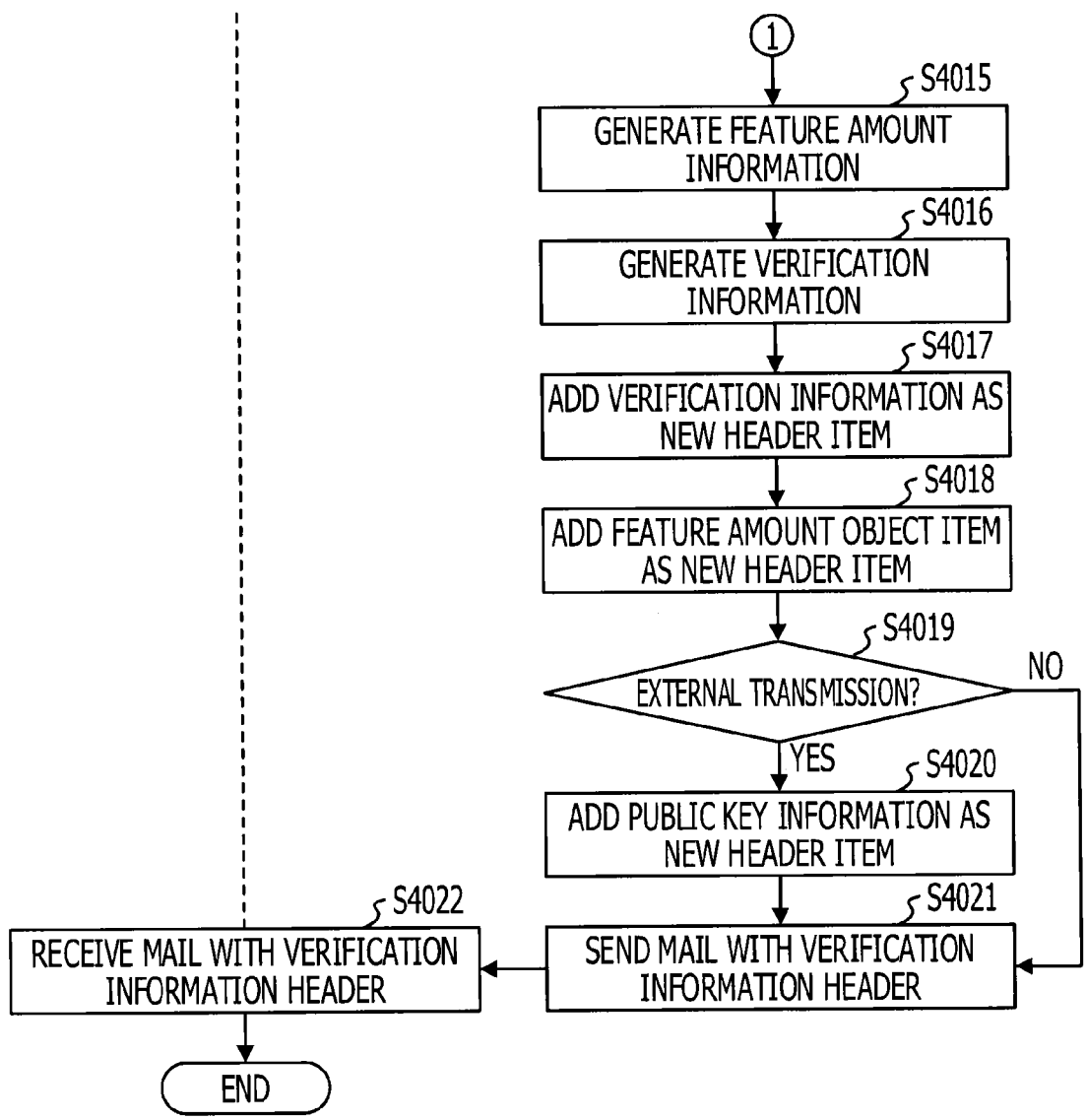
Figure 13:
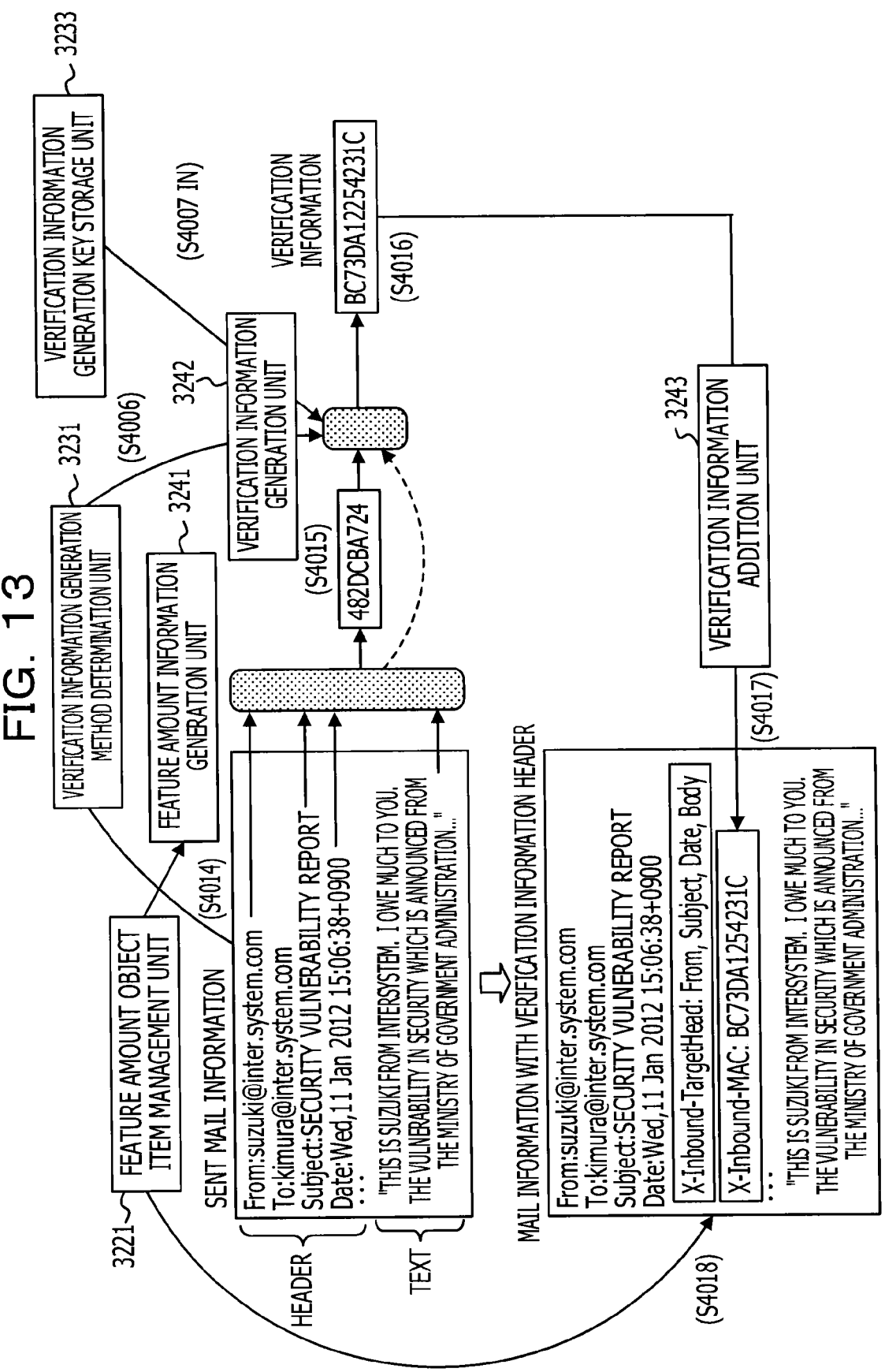
FIG. 13 is a diagram illustrating an example of a process of generating and adding the verification information during use of an internal transmission generation key.
Figure 14:
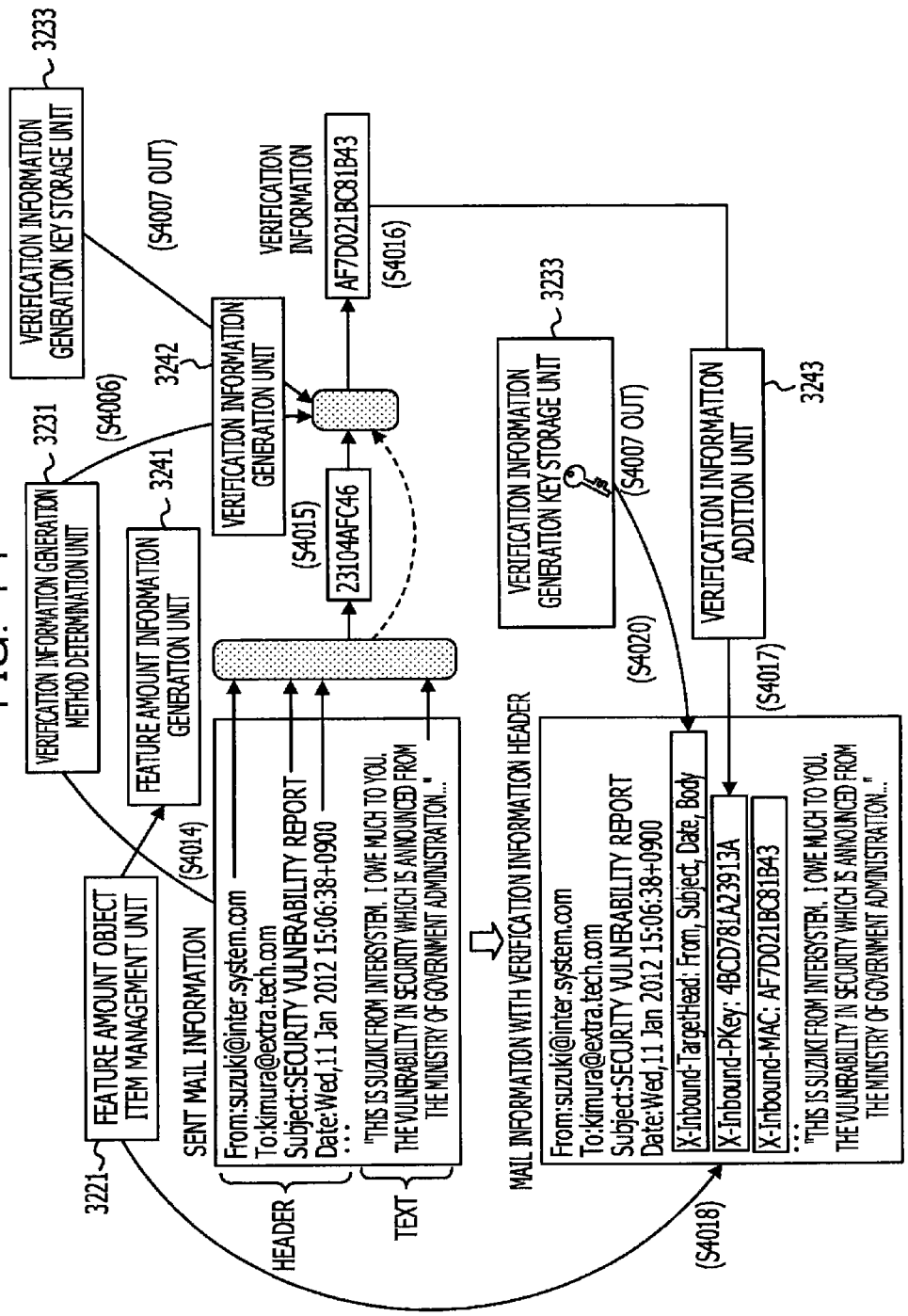
FIG. 14 is a diagram illustrating an example of a process of generating and adding the verification information during use of an external transmission generation key.

FIGS. 12A and 12B are flowcharts of a process of generating the verification information in the verification information generation device 32 of the email sending terminal 3. In addition, FIG. 13 is a diagram illustrating an example of a process of generating and adding the verification information during use of the internal transmission generation key. The internal transmission generation key is internal transmission secret key information. FIG. 14 is a diagram illustrating an example of a process of generating and adding the verification information during use of the external transmission generation key. The external transmission generation key is external transmission secret key information.

The sender X starts up the email software 31 using the email sending terminal 3. In addition, the sender X writes a transmission email. After writing the email, the email software 31 issues a request for generation of the verification information to the information generation device 32. The email software 31 outputs the transmission email including header information and text information to the verification information generation device 32.

The verification information generation device 32 receives a request for generation of the verification information from the email software 31 via the input and output unit 3211 of the request receiving unit 321. In addition, the request receiving unit 321 sends the verification information generation request to the verification information generation unit 324 (S4001). Here, the transmission email including the header information and text information received from the email software 31 is output to the verification information generation unit 324.

The verification information generation unit 324 receives the verification information generation request (S4002). The verification information generation unit 324 sends a generation key acquisition request to the generation key management unit 323 (S4003). Here, the header information of the sent mail is output so that the generation key management unit 323 is able to determine whether the internal transmission or the external transmission is made.

The generation key management unit 323 receives the generation key acquisition request (S4004). Subsequently, the verification information generation method determination unit 3231 in the generation key management unit 323 analyzes the header information of the sent mail (S4005).

Specifically, as illustrated in FIGS. 13 and 14, by checking a To: header of the header information of the sent mail, whether the internal transmission or the external transmission is made is determined (S4006). As in FIG. 13, when the domain after @ of kimura@inter.system.com of the To: header is a domain (inter.system.com) that represents the internal transmission, it is determined that the internal transmission is made. As in FIG. 14, when the domain after @ of satoh@extra.tech.com of the To: header is a domain (extra.tech.com) that represents the external transmission, it is determined that the external transmission is made. That is, it is preferable that the verification information generation method determination unit 3231 ascertain information of the domain of the mail address of the sender X. In a case of not ascertaining the information, the verification information generation method determination unit 3231 determines the internal transmission when the domains of both the headers of From and To match each other and determines the external transmission in a case of a mismatch therebetween.

In the case of the internal transmission determined by the verification information generation method determination unit 3231, the verification information generation key storage unit 3233 acquires the internal transmission secret key information (S4007IN). In addition, the verification information generation key storage unit 3233 outputs the information to the verification information generation unit 324 (S4008). On the other hand, in the case of the external transmission, the verification information generation key storage unit 3233 acquires an external transmission key pair (the secret key information and the public key information) (S4007OUT). In addition, the verification information generation key storage unit 3233 outputs the pair to the verification information generation unit 324 (S4008).

The verification information generation unit 324 receives the generation key (S4009). The verification information generation unit 324 subsequently sends a feature amount object item acquisition request to the management unit 322 (S4010).

The management unit 322 receives the feature amount object item acquisition request (S4011). The feature amount object item is acquired from the feature amount object item management unit 3221 (S4012). The acquisition method of the management unit 322 is as described above. In addition, the management unit 322 sends the feature amount object item to the verification information generation unit 324 (S4013).

The verification information generation unit 324 acquires the feature amount object item (S4014). In addition, the verification information generation unit 324 generates feature amount information using the information of the feature amount object item (S4015).

FIGS. 13 and 14 specifically illustrate a process of generating the feature amount information. The feature amount information generation unit 3241 generates feature amount information regarding four items of a From: header, a Subject: header, a Date: heater, and Body: text information of the header information of the sent mail, which are feature amount object items (S4015). FIG. 13 that indicates the internal transmission illustrates that "482DCBA724" is generated as the feature amount information. FIG. 14 that indicates the external transmission illustrates that "23104AFC46" is generated as the feature amount information.

The feature amount information corresponds to hash information generated using, for example, a one-way hash function. Accordingly, the feature amount information becomes a digest information having a relatively short fixed size. By using the one-way hash function, the encryption process using the secret key information may be facilitated. However, a method of generating a feature amount using a different generation algorithm from the one-way hash function may also be used. In order to ensure the consistency during verification, the verification device 32 on the sending side shares the function of the generation algorithm with the feature amount information generation units 6231 and 9221 of the verification devices 62 and 92 on the receiving side.

In addition, in this example, although the feature amount information is generated by the hash function for the feature amount object item, as indicated by the broken line arrows of FIGS. 13 and 14, feature amount object information having information of the feature amount object item as it is may also be used as the feature amount information. However, in a case of selecting the latter, compared to the former, there is a possibility of the verification information being fabricated by an attacker. Therefore, as in the former, it is preferable that the generation algorithm such as the hash function be secretly shared by the sending side and the receiving side, and the feature amount information be generated by the generation algorithm from the information of the feature amount object item.

When the generation of the feature amount information is completed, the verification information generation unit 324 generates verification information (S4016). Specifically, secret key information of the generation key is acquired from the verification information generation key storage unit 3233. In addition, the encryption process is performed using the secret key information.

In the case of the internal transmission, as illustrated in FIG. 13, the verification information generation unit 3242 generates verification information by performing the encryption process on the feature amount information using the internal transmission secret key information. FIG. 13 illustrates that "BC73DA1254231C" is generated as the verification information.

In the case of the external transmission, as illustrated in FIG. 14, the verification information generation unit 3242 generates verification information by performing the encryption process on the feature amount information using the external transmission secret key information. FIG. 14 illustrates that "AF7D021BC81B43" is generated as the verification information.

Next, the verification information addition unit 3243 adds the verification information to the header information of a sent mail as new header information (S4017). Moreover, the verification information addition unit 3243 also adds the feature amount object item to the header information of the sent mail as new header information (S4018). The feature amount object item is information to be used when performing verification during mail reception. During mail reception, as in the same method as during transmission, feature amount information is generated from the information of the feature amount object item added to the header information. Therefore, by adding the feature amount object item to the header information of the sent mail, the mail checker of the receiving terminal may generate the feature amount information.

In the examples of FIGS. 13 and 14, From, Subject, Date, and Body that directly indicate feature amount object items are added to the header information. However, encryption information corresponding to feature amount object items, for example, feature amount object item information corresponding to feature amount object items such as importance ranks may also be added to the header information. In this case, security characteristics are enhanced.

In FIG. 13 that indicates the internal transmission, an X-Inbound-Target Head: header is generated as new header information for the feature amount object item, and "From, Subject, Date, and Body" which are the feature amount object items are added. In addition, as the header information of the verification information, an X-Inbound-message authentication code (MAC): header is generated, and "BC73DA1254231C" which is the verification information is added.

In the case of the external transmission (YES in S4019), the verification information addition unit 3243 adds, as information for performing verification during mail reception, external transmission public key information corresponding to the encryption external transmission secret key information in addition to the feature amount object item and the verification information added during the internal transmission (S4020). However, the external transmission public key information may also be posted on a public Internet site, and in this case, is not added to the header information.

In FIG. 14 that indicates the external transmission, an X-Inbound-public key (PKey): header is generated as new header information of the external transmission public key information, and "4BCD781A23913A" which is the external transmission public key information is added.

The verification information addition unit 3243 may also add the encryption information that indicates the generation algorithm such as the one-way hash function for generating feature amount as the header information. In this manner, the sending side and the receiving side might not share the generation algorithm.

By the process so far, generation of the transmission email including the header information with the verification information is completed. Here, the verification information generation unit 324 sends mail information with the verification information to the request receiving unit 321 (S4021). The request receiving unit 321 receives the mail information with the verification information (S4022). In addition, when the request receiving unit 321 outputs the mail information with the verification information to the email software 31, the email software 31 sends an email to the recipient via the communication device 33. In the case of transmission to the recipient A, the email passes through the sending mail (SMTP) server 4 partway. On the other hand, in the case of transmission to the recipient B, the email is sent via the sending mail (SMTP) server 7 partway.

Process of Receiving Email

Next, a receiving process performed by the email receiving terminals 6 and 9 will be described.

Figure 15A:
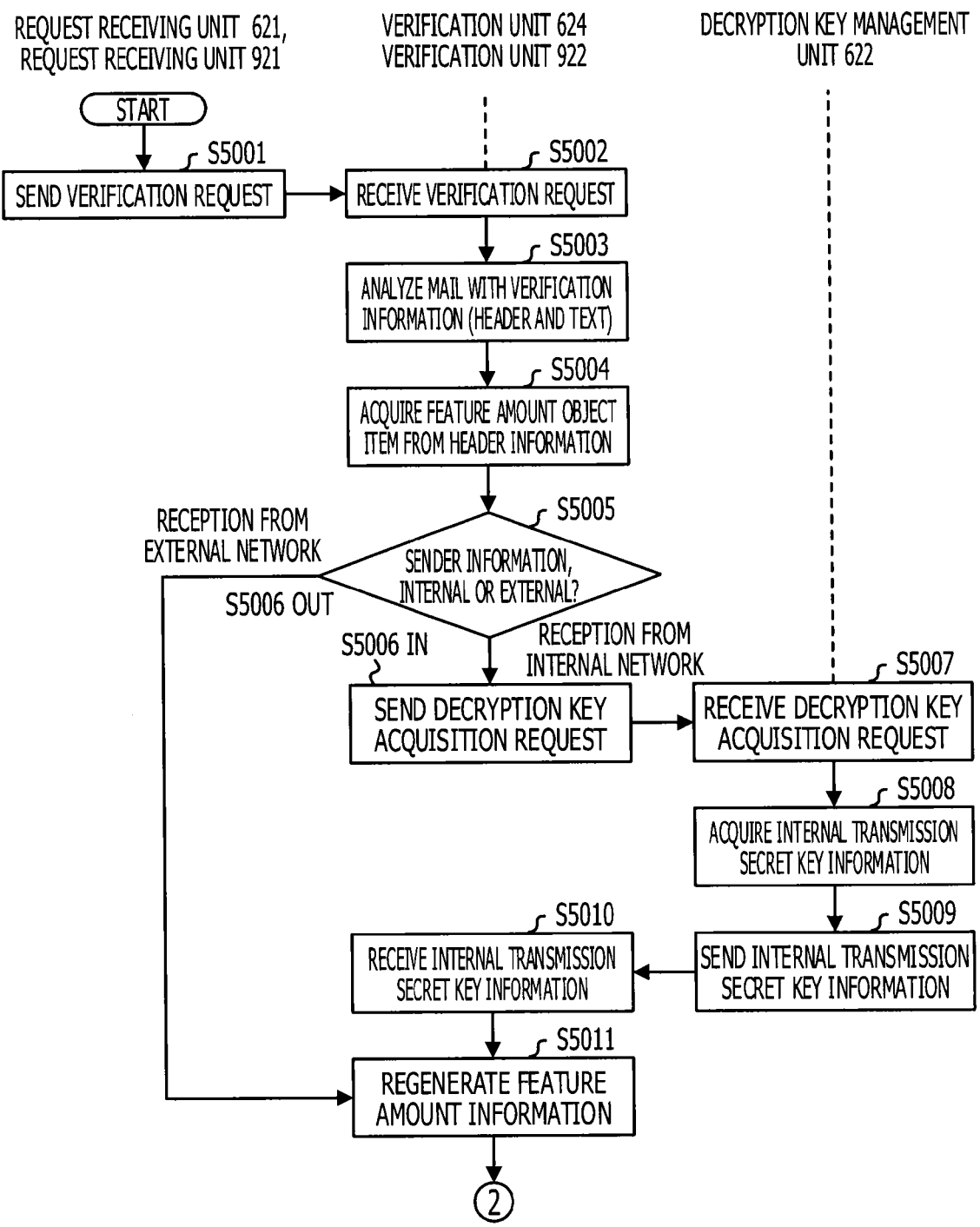
FIGS. 15A and 15B are flowcharts of a process of verifying the verification information performed by a verification device.
Figure 15B:
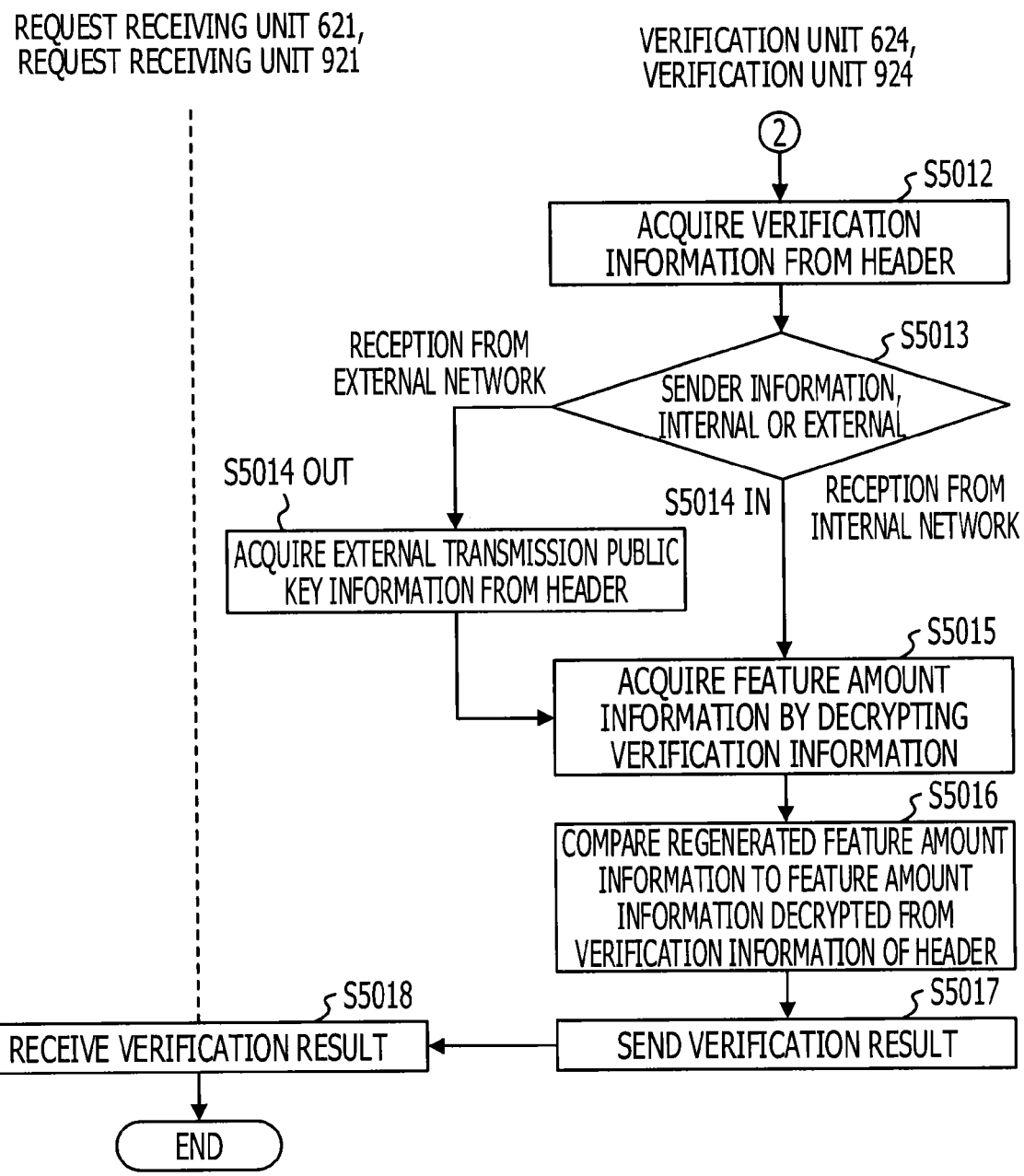
Figure 17:
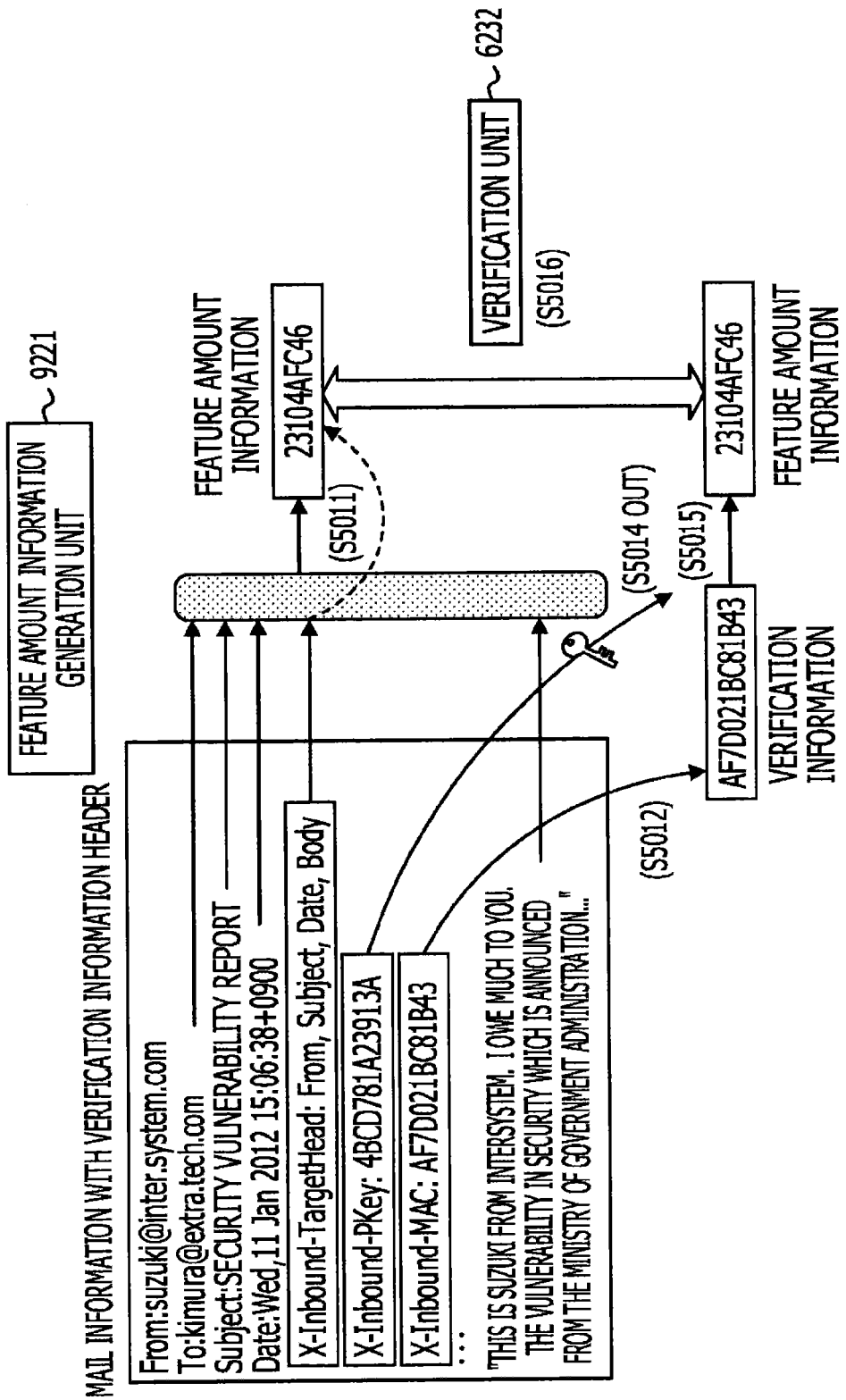
FIG. 17 is a diagram illustrating an example of the verification process during use of an external generation key.

FIGS. 15A and 15B are flowcharts of a process of verifying the verification information performed by the verification device 62 and the verification 92 of the email receiving terminals 6 and 9, respectively. FIG. 16 is a diagram illustrating an example of the verification process during use of an internal generation key. FIG. 17 is a diagram illustrating an example of the verification process during use of an external generation key.

First, the verification process during reception of the recipient A in the internal network will be described using FIGS. 15A, 15B, and 16. The recipient A performs the process of receiving an email by starting up the email software 61 in the email receiving terminal 6. Here, a mail with the verification information is received via the receiving mail (POP) server 5.

In addition, the email software 61 adds the mail with the verification information and issues a request for verification of the verification information to the verification device 62 of the mail checker. The verification device 62 receives the request for verification of the verification information from the email software 61 via the input and output unit 6211 of the request receiving unit 621. The request receiving unit 621 sends a verification request to a verification unit 624 (S5001). The request receiving unit 621 provides the mail with the verification information received from the email software 61 to the verification unit 624.

The verification unit 624 receives the verification request (S5002). The verification unit 624 analyzes the header information and the text information of the mail with the verification information (S5003). Subsequently, the verification unit 624 acquires feature amount object items from the header information (S5004).

Specifically, the verification unit 624 checks which item is a generation object of feature amount information with reference to an X-Inbound-TargetHead: header corresponding to the feature amount object item illustrated in FIG. 16. In this example, as described in the process during transmission, the feature amount information is generated for four items including a From: header, a Subject: header, a Date: header, and Body: text information. In addition, as described later, the feature amount information generation unit 6231 extracts the feature amount object item from the received email and regenerates feature amount information using a function of a generation algorithm, (S5011).

After acquiring the feature amount object item, the verification units 624 and 922 determine whether reception from the internal network or reception from the external network is made (S5005). This determination may be made using, for example, the domain after @ of the mail address described in the FROM: header of the received mail. In the example of FIG. 16, the reception from the internal network is determined. Here, the verification unit 624 sends a decryption key acquisition request to the decryption key management unit 622 (S5006IN). A decryption key is the internal transmission secret key information.

The decryption key management unit 622 receives the decryption key acquisition request (S5007). In addition, the decryption key management unit 622 acquires the internal transmission secret key information from the verification information decryption key storage unit 6222 (S5008). In addition, the decryption key management unit 622 sends the internal transmission secret key information to the verification unit 624 (S5009). The verification unit 624 receives the internal transmission secret key information (S5010).

After receiving the feature amount object item and the decryption key, the verification unit 624 regenerates feature amount information using the information of the feature amount object item (S5011). Specifically, as illustrated in FIG. 16, the feature amount information generation unit 6231 regenerates the feature amount information using a generation algorithm such as the same one-way hash function as in the sending side for information of the four items including the From: header, the Subject: header, the Date: heater, and the Body: text information of the header information. In FIG. 16, "482DCBA724" is generated as the feature amount information.

When the feature amount information is regenerated, when function correspondence information corresponding to the function of the feature amount generation algorithm is added to the header of the received mail, the feature amount information generation unit 6231 generates the feature amount information from the feature amount object items using the corresponding function with reference to the function correspondence information.

In addition, when the feature amount information is regenerated, when the feature amount object item information which is encryption information corresponding to the feature amount object item is added to the header of the received mail, the feature amount information generation unit 6231 acquires the feature amount object item corresponding to the feature amount object item information from the feature amount object item list of FIG. 11. The feature amount information generation unit 6231 generates feature amount information using the feature amount generation algorithm from the feature amount object item.

Moreover, when the feature amount information is regenerated, when the feature amount object information of the information of the feature amount object item itself is used on the sending side as the feature amount information without an operation using the one-way hash function, in the same manner, the feature amount object information of the information of the feature amount object item itself is also used on the receiving side as the feature amount information as indicated by the broken line arrow of FIG. 16.

Subsequently, the verification unit 624 acquires verification information added to the header information (S5012). For example, as illustrated in FIG. 16, "BC73DAl254231C" of the verification information is acquired with reference to an X-Inbound-MAC: header.

In addition, in the example in FIG. 16, when the receiving terminal receives an email from the internal network (S5014IN), the verification unit 624 decrypts the verification information using the internal transmission secret information acquired from the decryption key management unit 622. In addition, the verification unit 624 acquires the feature amount information from the verification information (S5015). As illustrated in FIG. 16, as the decryption result, "482DCBA724" is generated.

When decryption of the verification information is completed, the verification unit 624 compares the decrypted feature amount information to the regenerated feature amount information (S5016). In addition, the verification unit 624 sends the comparison confirmation result to the request receiving unit 621 (S5017).

The request receiving unit 621 receives the verification result (S5018). In addition, the request receiving unit 621 outputs the verification result to the email software 61, and the recipient A is notified of the verification result via the output device 64.

In the example of FIG. 16, since the regenerated feature amount information "482DCBA724" and the decrypted feature amount information "482DCBA724" match each other, it is notified that the received email is an appropriate received mail. On the other hand, in a case of a mismatch therebetween, the suspicion of a spoofed received mail such as a targeted attack email is notified to the recipient A.

Next, the verification process performed during reception of the recipient B of the external network will be described using FIGS. 15A, 15B, and 17. The recipient B performs the process of receiving an email by starting up the email software 91 installed in the email receiving terminal 9. Here, a mail with the verification information is received via the receiving mail (POP) server 8.

After receiving a request for reception of the email, the email software 91 adds the mail with the verification information and issues a request for verification of the verification information to the verification device 92. The verification device 92 receives the request for verification of the verification information from the email software 91 via the input and output unit 9211 of the request receiving unit 921. The request receiving unit 921 sends a verification request to a verification unit 922 (S5001). Here, the request receiving unit 921 sends the mail with the verification information received from the email software 91 to the verification unit 922 together with the request for verification.

The verification unit 922 receives the verification request (S5002). The verification unit 922 analyzes the header information and the text information of the mail with the verification information (S5003). In addition, the verification unit 922 acquires feature amount object items from the header information of the received mail with the verification information (S5004).

Specifically, the verification unit 922 checks which item is a generation object of feature amount information with reference to an X-Inbound-TargetHead: header corresponding to the feature amount object item illustrated in FIG. 17. In the example of FIG. 17, the feature amount object items are four items including a From: header, a Subject: header, a Date: header, and Body: text information. The feature amount information is generated from the items.

After acquiring the feature amount object items, the verification unit 922 determines whether reception from the internal network or reception from the external network is made (S5005). This determination may be made using, for example, the domain after @ of the mail address described in the FROM: header of the received mail with the verification information. In the example of FIG. 17, the reception from the external network is determined (S5006OUT). Since the decryption key is stored in the header information, an acquisition request is not issued to the decryption key management unit.

After receiving the feature amount object item and the decryption key, the verification unit 922 regenerates feature amount information using the information of the feature amount object item (S5011). Specifically, as illustrated in FIG. 17, the feature amount information generation unit 9221 regenerates the feature amount information using a predetermined generation algorithm shared with the sending side from the information of the four items including the From: header, the Subject: header, the Date: heater, and the Body: text information of the header information. The predetermined generation algorithm is, for example, a one-way hash function. In FIG. 17, "23104AFC46" is generated as the feature amount information.

Next, the verification unit 922 acquires verification information added to the header information (S5012). As illustrated in FIG. 17, "AF7D021BC81B43" of the added verification information is acquired with reference to an X-Inbound-MAC: header.

Since the reception from the external network is made, the verification unit 922 acquires external transmission public key information added to the header information (S5014OUT). Specifically, as illustrated in FIG. 17, "4BCD781A23913A" is acquired with reference to an X-Inbound-PKey header. The verification unit 922 acquires feature information by decrypting the verification information using the external transmission public key information (S5015). As illustrated in FIG. 17, as the decryption result, "23104AFC46" is generated.

When decryption of the verification information is completed, the verification unit 922 compares the decrypted feature amount information to the regenerated feature amount information (S5016). In addition, the comparison confirmation result is sent to the request receiving unit 921 (S5017).

The request receiving unit 921 receives the verification result (S5018). In addition, the request receiving unit 921 outputs the verification result to the email software 91, and the recipient B is notified of the verification result via the output device 94.

Even in the terminal that receives the email sent over the external network, as in the case of transmission in the internal network, during regeneration of the feature amount information, the following modification examples are possible.

First, when the feature amount information is regenerated, the feature amount information generation unit 9221 refers to the function correspondence information in the case where the function correspondence information corresponding to the function of the feature amount generation algorithm is added to the header of the received mail. In addition, the feature amount information generation unit 9221 generates feature amount information from the information of the feature amount object item using the corresponding function.

In addition, when the feature amount information is regenerated, in the case where the feature amount object item information which is the encryption information corresponding to the feature amount object item is added to the header of the received mail, the verification unit 922 acquires the feature amount object item corresponding to the feature amount object item information from the feature amount object item list of FIG. 11. The verification unit 922 generates the feature amount information from the information of the feature amount object item using the feature amount generation algorithm.

Moreover, when the feature amount information is regenerated, in the case where the feature amount object information of the feature amount object item itself is used as the feature amount information by the sending side without an operation using the one-way hash function, the feature amount object information of the feature amount object item itself is used as the feature amount information by the receiving side in the same manner. As indicated by the broken line arrow of FIG. 17, the operation using the one-way hash function is not performed.

In addition, even in the case where the external transmission public key information is not added to the header of the received mail, the external transmission public key information is acquired from a predetermined Internet site in which the external transmission public key information is published, thereby performing the decryption process.

The terminal that receives the email sent over the external network performs encryption and decryption using a key pair of the external transmission secret key information and the public key information. Therefore, the public key information not being generated by a third party is not guaranteed. Here, the verification unit 922 may request that an authentication service provider authenticates the external transmission public key information added to the received mail so as to perform a process of receiving the authentication result. The authentication service provider registers the external transmission secret key information and the public key information. In addition, the authentication service provider authenticates secret key information corresponding to the requested public key information as an information that is a legitimate secret key information, that is, a key from a legitimate sender. Accordingly, even though a spoofed third party generates external transmission secret key information and public key information by itself and sends an email with authentication information using the information, this may be detected by the authentication process of the public key authentication service provider.

In addition, even though an email with verification information from the external transmission secret key information and the public key information generated by a spoofed third party is received, when the generation algorithm for generating feature amount information is secretly maintained, the email from the spoofed third party may be detected since regenerated feature amount information and decrypted feature amount information do not match each other.

Example of Email Broadcasted over Internal and External Networks

In this embodiment, a broadcasting mail may be sent from the sender X to the recipient A and the recipient B. That is, a single mail is sent from the sender X through internal transmission and external transmission. In this case, the mail checker of the sending terminal performs both the process in the case of the internal network described above and the process in the case of the external network. The mail checker of the receiving terminal performs verification by performing the above-described receiving process in the case of the internal network, and performs verification by performing the above-described receiving process in the case of the external network.

As above, in this embodiment, even when SPF/Sender ID or DKIM which is implemented on the server side is not used, a spoofed mail such as a targeted attack mail may be detected on the client side. Specifically, since the verification information including the header information or the text information is generated and verification is performed using the internal transmission secret key information or the external transmission secret key information, verification information may not be generated by forging the header information as long as those pieces of secret information are not leaked to attackers. Therefore, a mail on which verification is not correctly performed although verification information is added thereto may be determined to have a possibility of a targeted attack mail, and the probability of receiving a targeted attack mail may be reduced by the detection.

The sending terminal 3 including the verification information generation device 32, the receiving terminal 6 including the verification device 62, and the receiving terminal 9 including the verification device 92 are computers. The computer has a central processing unit (CPU), a read only memory (ROM), a random access memory (RAM), a hard disk drive (HDD), and a communication device. The computer may further include a medium reading device. The units are connected to each other via buses. In addition, the units may transmit and receive data to and from each other under the management of the CPU.

A program in which the processes illustrated in FIGS. 8, 9, 10, 12A, and 12B are described is recorded on a computer-readable recording medium. In addition, for example, the medium reading device reads out the program from the recording medium on which the program is recorded. The CPU stores the read program in the HDD. In addition, various programs may also be stored in the ROM or the RAM that may be accessed by the CPU. In addition, as the CPU reads out and executes the corresponding program from the HDD, the CPU functions as the request receiving unit 321, the generation key management unit 323, the management unit 322, and the verification information generation unit 324 in the sending terminal 3.

In addition, a program in which the processes illustrated in FIGS. 15A and 15B is recorded on a computer-readable recording medium. In addition, for example, the medium reading device reads out the program from the recording medium on which the program is recorded. The CPU stores the read program in the HDD. In addition, as the CPU reads out and executes the corresponding program from the HDD, the CPU functions as the request receiving unit 621, the decryption key management unit 622, and the verification unit 623 in the receiving terminal 6. In addition, the CPU functions as the request receiving unit 921 and the verification unit 922 in the receiving terminal 9.

As the computer-readable recording medium, there are a magnetic recording device, an optical disk, a magneto-optical recording medium, a semiconductor memory, and the like. As the magnetic recording device, there are an HDD, a flexible disk (FD), a magnetic tape (MT), and the like.

As the optical disk, there are a digital versatile disc (DVD), a DVD-RAM, a compact disc-read only memory (CD-ROM), a CD-recordable (R)/rewritable (RW), and the like. As the magneto-optical recording medium, there are a magneto-optical disk (MO), and the like. In a case of circulating the program, for example, it is thought that a portable recording medium such as a DVD or a CD-ROM on which the program is recorded is purchased.

Furthermore, the HDD functions as a storage unit that stores various types of information under the management of the CPU. Like the program, various types of information may be stored in the ROM or the RAM that is able to be accessed by the CPU. The communication device transmits and receives information to and from other devices connected via interfaces.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A detecting method which detects a spoofed email to be executed by a computer system, the detecting method comprising:
sharing internal transmission secret key information to be used for an email over an internal network in advance by a sending terminal and a receiving terminal;
generating external transmission secret key information to be used for an email over an external network and external transmission public key information corresponding to the external transmission secret key information;
generating first feature information corresponding to a sent email based on a feature item including at least one of a header item, text and attached information included in the sent email;
determining whether a destination of the sent email is the internal network or the external network;
generating, upon determining that the destination of the sent email is the internal network, verification information using the first feature information and the internal transmission secret key information;
generating, upon determining that the destination of the sent email is the external network, the verification information using the first feature information and the external transmission secret key information;
adding the verification information and the feature item to a header of the sent email;
identifying the feature item in a received email corresponding to the sent email;
generating second feature information based on the feature item;
determining whether a source of the received email is the internal network or the external network;
generating, upon determining that the source of the received email is the internal network, third feature information based on the verification information and the internal transmission secret key information;
generating, upon determining that the source of the received email is the external network, the third feature information based on the verification information and the external transmission public key information; and
verifying the received email by comparing the second feature information to the third feature information.

2. The method claim 1, wherein the adding includes:
adding the external transmission public key information to the header of the sent email when the destination of the sent email is the external network.

3. The method of claim 2, further comprising:
sending the external transmission public key information added to the received email to a public key authentication server; and
receiving an authentication result of the external transmission public key information from the public key authentication server.

4. The method claim 1, wherein the adding includes:
adding the external transmission public key information to the header of the sent email when the destination of the sent email is both the internal network and the external network.

5. The method of claim 1, further comprising:
generating the first feature information based on the feature item and a predetermined function; and
generating the second feature information based on the feature item and the predetermined function.

6. The method of claim 5, wherein
the predetermined function is a one-way hash function, and
the first and second feature information is first and second hash information respectively obtained from by the one-way hash function.

7. The method of claim 5, wherein the adding includes:
adding function correspondence information corresponding to the predetermined function to the header of the sent email.

8. The method of claim 7, wherein the generating of the second feature information includes:
using a function corresponding to the function correspondence information added to the header of the received email as the predetermined function.

9. The detecting method according to claim 5, wherein the sharing includes:
sharing the predetermined function between the sending terminal and the receiving terminal.

10. The method of claim 1, wherein
the feature information item is encryption information.

11. The method of claim 1, further comprising:
outputting a warning that the received email is a spoofed mail in a case of a mismatch in the comparison result.

12. A system for detecting a spoofed email, the system comprising:
a memory; and
a processor coupled to the memory and configured to
share internal transmission secret key information to be used for an email over an internal network in advance by a sending terminal and a receiving terminal;
generate external transmission secret key information to be used for an email over an external network and external transmission public key information corresponding to the external transmission secret key information;
generate first feature information corresponding to a sent email based on a feature item including at least one of a header item, text and attached information included in the sent email;
determine whether a destination of the sent email is the internal network or the external network;
generate, upon determining that the destination of the sent email is the internal network, verification information using the first feature information and the internal transmission secret key information;
generate, upon determining that the destination of the sent email is the external network, the verification information using the first feature information and the external transmission secret key information;
add the verification information and the feature item to a header of the sent email;
identify the feature item in a received email corresponding to the sent email;
generate second feature information based on the feature item;
determine whether a source of the received email is the internal network or the external network;
generate, upon determining that the source of the received email is the internal network, third feature information based on the verification information and the internal transmission secret key information;
generate, upon determining that the source of the received email is the external network, the third feature information based on the verification information and the external transmission public key information; and
verify the received email by comparing the second feature information to the third feature information.

13. A non-transitory computer-readable medium including computer-program instructions, which when executed by an information processing system, cause the system to:
share internal transmission secret key information to be used for an email over an internal network in advance by a sending terminal and a receiving terminal;
generate external transmission secret key information to be used for an email over an external network and external transmission public key information corresponding to the external transmission secret key information;
generate first feature information corresponding to a sent email based on a feature item including at least one of a header item, text and attached information included in the sent email;
determine whether a destination of the sent email is the internal network or the external network;
generate, upon determining that the destination of the sent email is the internal network, verification information using the first feature information and the internal transmission secret key information;
generate, upon determining that the destination of the sent email is the external network, the verification information using the first feature information and the external transmission secret key information;
add the verification information and the feature item to a header of the sent email;
identify the feature item in a received email corresponding to the sent email;
generate second feature information based on the feature item;
determine whether a source of the received email is the internal network or the external network;
generate, upon determining that the source of the received email is the internal network, third feature information based on the verification information and the internal transmission secret key information;
generate, upon determining that the source of the received email is the external network, the third feature information based on the verification information and the external transmission public key information; and
verify the received email by comparing the second feature information to the third feature information.

14. A transmitting device comprising:
a memory; and
a processor coupled to the memory and configured to
share internal transmission secret key information to be used for an email over an internal network in advance by the transmitting device and a receiving device;
generate external transmission secret key information to be used for an email over an external network and external transmission public key information corresponding to the external transmission secret key information;
generate feature information corresponding to an email based on a feature item including at least one of a header item, text and attached information included in the email;
determine whether a destination of the email is the internal network or the external network;
generate, upon determining that the destination of the email is the internal network, verification information using the feature information and the internal transmission secret key information;

generate, upon determining that the destination of the email is the external network, the verification information using the feature information and the external transmission secret key information;

add the verification information and the feature item to a header of the email; and send the email including the verification and the feature item added to the header of the email to the receiving another electronic device allowing the receiving device to validate the sent email based on the verification information and the feature item.

15. A receiving device comprising:

a processor; and a processor coupled to the memory and configured to receive an email from a transmitting device, the email including a header including verification information and a feature item, the verification information generated based on first feature information generated based on the feature item and a key selected based on whether a destination of the email is an internal network or an external network;

extract the header from the received email;

generate second feature information based on the feature item;

determine whether a source of the received email is the internal network or the external network;

generate, upon determining that the source of the received email is the internal network, third feature information based on the verification information and internal transmission secret key information shared in advance between the transmitting device and the receiving device;

generate, upon determining that the source of the received email is the external network, the third feature information based on the verification information and external transmission public key information identified from the extracted header of the received email; and verify the received email by comparing the second feature information to the third feature information.

\* \* \* \* \*